(12) United States Patent
Armstrong-Crews et al.

(10) Patent No.: US 12,050,267 B2
(45) Date of Patent: Jul. 30, 2024

(54) DOPPLER-ASSISTED OBJECT MAPPING FOR AUTONOMOUS VEHICLE APPLICATIONS

(71) Applicant: Waymo LLC, Mountain View, CA (US)

(72) Inventors: Nicholas Armstrong-Crews, Mountain View, CA (US); Mingcheng Chen, Sunnyvale, CA (US); Xiaoxiang Hu, Mountain View, CA (US); Colin Andrew Braley, Sunnyvale, CA (US); Yunshan Jiang, Mountain View, CA (US)

(73) Assignee: Waymo LLC, Mountain View, CA (US)

( * ) Notice: Subject to any disclaimer, the term of this patent is extended or adjusted under 35 U.S.C. 154(b) by 934 days.

(21) Appl. No.: 16/949,657

(22) Filed: Nov. 9, 2020

(65) Prior Publication Data

US 2022/0146676 A1 May 12, 2022

(51) Int. Cl.
*G01S 17/89* (2020.01)
*B60W 40/02* (2006.01)
*G01S 17/26* (2020.01)
*G01S 17/58* (2006.01)

(52) U.S. Cl.
CPC ............ *G01S 17/89* (2013.01); *B60W 40/02* (2013.01); *G01S 17/26* (2020.01); *G01S 17/58* (2013.01); *B60W 2420/408* (2024.01)

(58) Field of Classification Search
None
See application file for complete search history.

(56) References Cited

U.S. PATENT DOCUMENTS

| | | | |
|---|---|---|---|
| 8,112,223 | B2 | 2/2012 | Jordan et al. |
| 9,851,470 | B2 | 12/2017 | Henderson et al. |
| 10,262,234 | B2 | 4/2019 | Li et al. |
| 10,620,631 | B1 | 4/2020 | Abeloe |
| 10,884,422 | B2 | 1/2021 | Zhang et al. |

(Continued)

FOREIGN PATENT DOCUMENTS

| CN | 106560725 A | 4/2017 |
|---|---|---|
| CN | 108027440 A | 5/2018 |

(Continued)

OTHER PUBLICATIONS

International Search Report and Written Opinion dated Feb. 18, 2022, on application No. PCT/US2021/057622, 12 pages.

(Continued)

*Primary Examiner* — Hovhannes Baghdasaryan
(74) *Attorney, Agent, or Firm* — Lowenstein Sandler LLP

(57) ABSTRACT

Aspects and implementations of the present disclosure address shortcomings of the existing technology by enabling efficient object identification and tracking in autonomous vehicle (AV) applications by using velocity data-assisted mapping of first set of points obtained for a first sensing data frame by a sensing system of the AV to a second set of points obtained for a second sensing data frame by the sensing system of the AV, the first set of points and the second set of points corresponding to an object in an environment of the AV, and causing a driving path of the AV to be determined in view of the performed mapping.

23 Claims, 7 Drawing Sheets

(56) References Cited

U.S. PATENT DOCUMENTS

| | | |
|---|---|---|
| 10,891,744 B1 | 1/2021 | Wyffels |
| 11,029,395 B1 | 6/2021 | Barber et al. |
| 11,328,210 B2 | 5/2022 | Mondello et al. |
| 11,448,735 B2 | 9/2022 | O'Keeffe |
| 2005/0099637 A1 | 5/2005 | Kacyra et al. |
| 2005/0285774 A1 | 12/2005 | Wittenberg et al. |
| 2007/0219720 A1 | 9/2007 | Trepagnier et al. |
| 2010/0161225 A1* | 6/2010 | Hyung ............... G05D 1/0274 345/420 |
| 2012/0064949 A1 | 3/2012 | Kavounas |
| 2014/0307247 A1 | 10/2014 | Zhu et al. |
| 2014/0347207 A1 | 11/2014 | Zeng et al. |
| 2015/0198711 A1 | 7/2015 | Zeng et al. |
| 2017/0097410 A1 | 4/2017 | Liu et al. |
| 2018/0136321 A1 | 5/2018 | Verghese et al. |
| 2018/0283851 A1 | 10/2018 | Watanabe et al. |
| 2018/0335787 A1 | 11/2018 | Zeng et al. |
| 2018/0348343 A1 | 12/2018 | Achour et al. |
| 2019/0011541 A1 | 1/2019 | O'Keeffe |
| 2019/0079193 A1 | 3/2019 | Gunnam |
| 2019/0120955 A1 | 4/2019 | Zhong et al. |
| 2019/0138822 A1 | 5/2019 | Yao et al. |
| 2019/0302767 A1 | 10/2019 | Sapp |
| 2019/0317219 A1 | 10/2019 | Smith et al. |
| 2019/0318206 A1 | 10/2019 | Smith et al. |
| 2020/0041619 A1 | 2/2020 | Maheshwari et al. |
| 2020/0182992 A1 | 6/2020 | Kellner et al. |
| 2020/0201351 A1 | 6/2020 | Armstrong-Crews et al. |
| 2020/0301013 A1 | 9/2020 | Banerjee et al. |
| 2020/0302237 A1 | 9/2020 | Hennings Yeomans et al. |
| 2020/0309957 A1 | 10/2020 | Bhaskaran et al. |
| 2020/0371228 A1 | 11/2020 | Wang |
| 2020/0398894 A1 | 12/2020 | Hudecek et al. |
| 2020/0400821 A1 | 12/2020 | Baker et al. |
| 2021/0001868 A1 | 1/2021 | Ahn |
| 2021/0024069 A1 | 1/2021 | Herman |
| 2021/0049779 A1 | 2/2021 | Harviainen |
| 2021/0056713 A1 | 2/2021 | Rangesh |
| 2021/0097723 A1 | 4/2021 | Kim et al. |
| 2021/0141092 A1 | 5/2021 | Chen et al. |
| 2021/0173055 A1 | 6/2021 | Jian et al. |
| 2021/0229657 A1 | 7/2021 | Herman et al. |
| 2021/0255307 A1 | 8/2021 | Bongio et al. |
| 2021/0256321 A1 | 8/2021 | Gerardo et al. |
| 2021/0261152 A1 | 8/2021 | Meijburg et al. |
| 2021/0261159 A1 | 8/2021 | Pazhayampallil et al. |
| 2021/0339738 A1 | 11/2021 | Lashkari et al. |
| 2021/0396887 A1 | 12/2021 | Schmalenberg |
| 2022/0058402 A1 | 2/2022 | Hunt |
| 2022/0119002 A1 | 4/2022 | Ladd |
| 2022/0122363 A1 | 4/2022 | Liong et al. |
| 2022/0128995 A1 | 4/2022 | Chen |
| 2022/0146676 A1 | 5/2022 | Armstrong-Crews |
| 2022/0229164 A1 | 7/2022 | Steinberg et al. |
| 2022/0276375 A1 | 9/2022 | Armstrong-Crews |
| 2022/0327719 A1 | 10/2022 | Shaag et al. |
| 2023/0076905 A1 | 3/2023 | Wyffels |

FOREIGN PATENT DOCUMENTS

| | | |
|---|---|---|
| CN | 111612818 A | 9/2020 |
| CN | 112041702 A | 12/2020 |
| EP | 3151034 A1 | 4/2017 |
| EP | 3252501 A1 | 12/2017 |
| EP | 3346287 A1 | 7/2018 |
| EP | 3367121 A1 | 8/2018 |
| EP | 3525000 A1 | 8/2019 |
| EP | 3367121 B1 | 4/2020 |
| EP | 3745158 A1 | 12/2020 |
| EP | 3775997 A2 | 2/2021 |
| JP | 2012518793 A | 8/2012 |
| JP | 2015035019 A | 2/2015 |
| JP | 2019049774 A | 3/2019 |
| KR | 20200011813 A | 2/2020 |
| KR | 20200139779 A | 12/2020 |
| WO | 2014168851 A1 | 10/2014 |
| WO | 2017038659 A1 | 3/2017 |
| WO | 2018127789 A1 | 7/2018 |
| WO | 2019154536 A1 | 8/2019 |
| WO | 2019199473 A2 | 10/2019 |
| WO | 2020210276 A1 | 10/2020 |
| WO | 2022087308 A1 | 4/2022 |
| WO | 2022094429 A1 | 5/2022 |

OTHER PUBLICATIONS

International Search Report and Written Opinion dated Feb. 15, 2022, on application No. PCT/US2021/056105, 10 pages.

International Search Report and Written Opinion dated Feb. 23, 2022, on application No. PCT/US2021/057623, 10 pages.

Cameron O., "An Introduction to LIDAR: The Key Self-Driving Car Sensor," Voyage, May 9, 2017, pp. 1-21.

Extended European Search Report for European Application No. 22175897.2, mailed Nov. 2, 2022, 10 Pages.

Office Action for Japanese Patent Application No. JP20230520411, mailed Dec. 26, 2023, 13 Pages.

Aeye iDAR "iDAR is Smarther than LiDAR", aeye.ai/idar/, retrieved Oct. 20, 2020, 11 pages.

Aurora "FMCW Lidar: The Self-Driving Game-Changer" medium.com/aurora-blog/fmcw-lidar-the-self-driving-game-changer-194fd311fd0e9, Apr. 9, 2020, retreived on Oct. 20, 2020, 6 pages.

GreenCarCongress.com "Aeva Announces Aeries 4D FMCW Lidar-on-chip for Autonomous Driving; Recent Porsche Investment", greecarcongress.com/2019/12/20191212.aeva.html, Dec. 12, 2019, 11 pages.

* cited by examiner

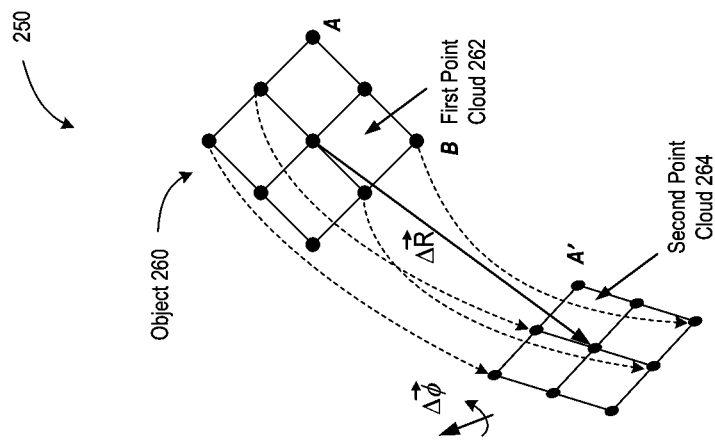
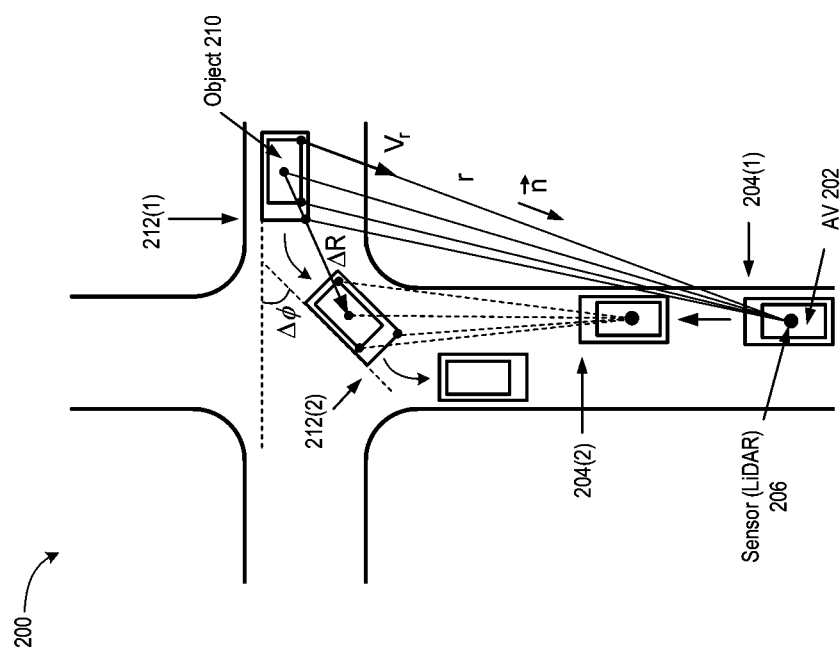
FIG. 2B
FIG. 2A

DOPPLER-ASSISTED OBJECT MAPPING FOR AUTONOMOUS VEHICLE APPLICATIONS

TECHNICAL FIELD

The instant specification generally relates to autonomous vehicles. More specifically, the instant specification relates to improving autonomous driving systems and components using velocity sensing data to assist in detection, identification, and tracking of objects encountered in autonomous driving environments.

BACKGROUND

Autonomous (fully and partially self-driving) vehicles operate by sensing an outside environment with various electromagnetic (e.g., radar and optical) and non-electromagnetic (e.g., audio and humidity) sensors. Some autonomous vehicles chart a driving path through the environment based on the sensed data. The driving path can be determined based on Global Positioning System (GPS) data and road map data. While the GPS and the road map data can provide information about static aspects of the environment (buildings, street layouts, road closures, etc.), dynamic information (such as information about other vehicles, pedestrians, street lights, etc.) is obtained from contemporaneously collected sensing data. Precision and safety of the driving path and of the speed regime selected by the autonomous vehicle depend on timely and accurate identification of various objects present in the driving environment and on the ability of a driving algorithm to process the information about the environment and to provide instructions to the vehicle controls and the drivetrain.

BRIEF DESCRIPTION OF THE DRAWINGS

The present disclosure is illustrated by way of examples, and not by way of limitation, and can be more fully understood with references to the following detailed description when considered in connection with the figures, in which:

FIG. 2A is an illustration of a Doppler-assisted object determination and tracking that utilizes point cloud mapping, as part of a perception system of an autonomous vehicle, in accordance with some implementations of the present disclosure.

FIG. 2B illustrates a mapping of a first point cloud (corresponding to a first sensing data frame) to a second point cloud (corresponding to a second sensing data frame), in accordance with some implementations of the present disclosure.

SUMMARY

Figure 1:
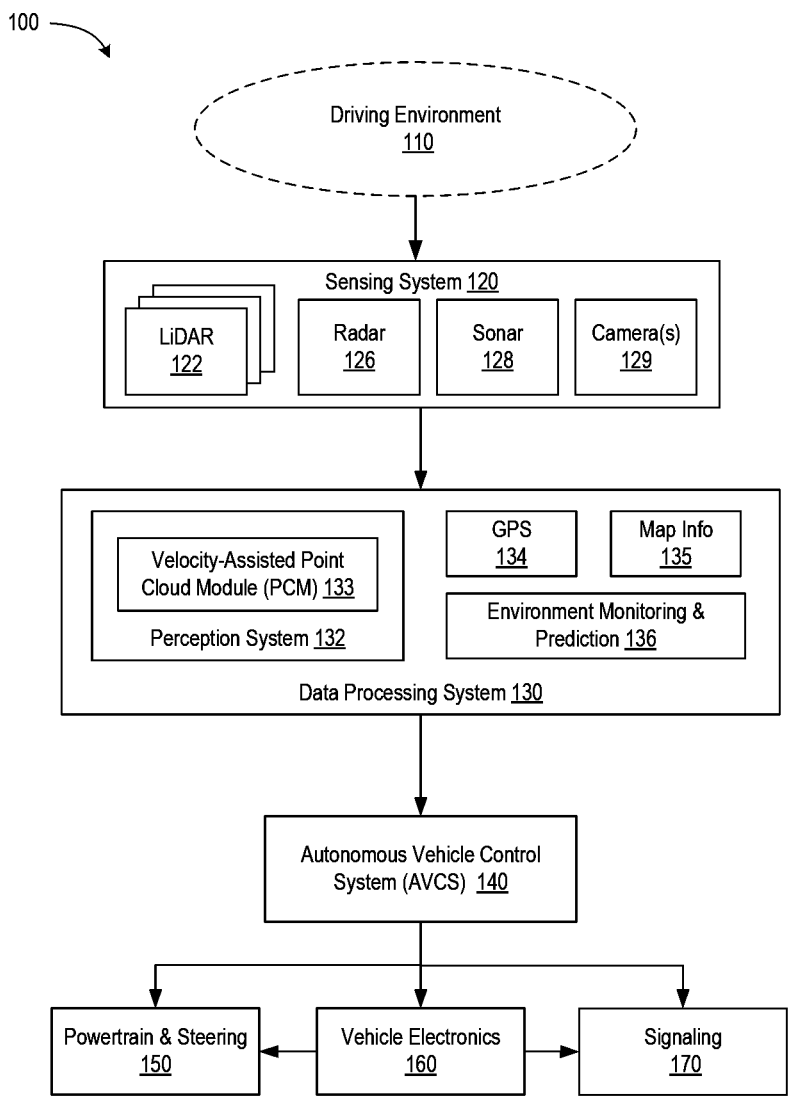
FIG. 1 is a diagram illustrating components of an example autonomous vehicle that uses Doppler-assisted object identification and tracking, in accordance with some implementations of the present disclosure.

In one implementation, disclosed is a method that includes obtaining, by a computing device, a plurality of sensing data frames of an environment around an autonomous vehicle (AV), each of the plurality of sensing data frames comprising a plurality of points, wherein each of the plurality of points corresponds to a reflection, from a surface of an object of the environment, of a signal emitted by a sensing system of the AV, and comprises a distance to a respective reflecting surface, and wherein one or more of the plurality of points comprise a velocity data for the respective reflecting surface. The disclosed method further includes evaluating, by the computing device, a hypothesis that a first set of points from a first sensing data frame of the plurality of sensing data frames corresponds to a second set of points from a second sensing data frame of the plurality of sensing data frames, wherein evaluating the hypothesis comprises mapping, in view of the velocity data for one or more of the first set of points or the second set of points, the first set of points to the second set of points, and determining, based on performed mapping, an evaluation measure for the hypothesis. The method disclosed further includes causing a driving path of the AV to be determined in view of the evaluation measure.

In another implementation, disclosed is a system that includes a memory that stores instructions and a computing device to execute the instructions from the memory to obtain a plurality of sensing data frames of an environment around an autonomous vehicle (AV), each of the plurality of sensing data frames comprising a plurality of points, wherein each of the plurality of points corresponds to a reflection, from a surface of an object of the environment, of a signal emitted by a sensing system of the AV, and comprises a distance to a respective reflecting surface, and wherein one or more of the plurality of points comprise a velocity data for the respective reflecting surface. The computing device is further to evaluate a hypothesis that a first set of points from a first sensing data frame of the plurality of sensing data frames corresponds to a second set of points from a second sensing data frame of the plurality of sensing data frames, wherein to evaluate the hypothesis the computing device is to map, in view of the velocity data for one or more of the first set of points or the second set of points, the first set of points to the second set of points, and determine, based on performed mapping, an evaluation measure for the hypothesis. The computing device is further to cause a driving path of the AV to be determined in view of the evaluation measure.

In another implementation, disclosed is a non-transitory computer-readable medium having instructions stored thereon that, when executed by a computing device, cause the computing device to obtain a plurality of sensing data frames of an environment around an autonomous vehicle (AV), each of the plurality of sensing data frames comprising a plurality of points, wherein each of the plurality of points corresponds to a reflection, from a surface of an object of the environment, of a signal emitted by a sensing system of the AV, and comprises a distance to a respective reflecting surface, and wherein one or more of the plurality of points comprise a velocity data for the respective reflecting surface. The instructions are further to cause the computing device to evaluate a hypothesis that a first set of points from a first sensing data frame of the plurality of sensing data frames corresponds to a second set of points from a second sensing data frame plurality of sensing data frames, wherein to evaluate the hypothesis the computing device it to map, in view of the velocity data for one or more of the first set of points or the second set of points, the first set of points to the second set of points, and determine, based on performed mapping, an evaluation measure for the hypothesis. The instructions are further to cause the computing device to cause a driving path of the AV to be determined in view of the evaluation measure.

DETAILED DESCRIPTION

An autonomous vehicle can employ a light detection and ranging (lidar) technology to detect distances to various objects in the environment and sometimes the velocities of such objects. A lidar emits one or more laser signals (pulses) that travel to an object and then detects arrived signals reflected from the object. By determining a time delay between the signal emission and the arrival of the reflected waves, a time-of-flight (ToF) lidar can determine the distance to the object. A typical lidar emits signals in multiple directions to obtain a wide view of the outside environment. For example, a lidar device can cover the entire 360-degree view by scanning to collect in a series of consecutive frames identified with time stamps. As a result, each sector in space is sensed in time increments $\Delta t$, which are determined by the angular velocity of the lidar's scanning speed. "Frame" or "sensing data frame," as used herein, can refer to an entire 360-degree view of the environment obtained over a scan of the lidar or, alternatively, to any smaller sector, e.g., a 1-degree, 5-degree, a 10-degree, or any other angle obtained over a fraction of the scan, or over a scan designed to cover a limited angle.

Each frame can include numerous return points (or simply "points") corresponding to reflections from various objects of the environment. Each point can be associated with the distance to the corresponding object or, more specifically, with the distance to an element of the surface of the object responsible for the respective return point. A set of points can be rendered or otherwise associated with a frame and sometimes referred to as a "point cloud." A point cloud can include returns from multiple objects. Typically, it is not known a priori how many objects are within a given frame. A single object, such as another vehicle, a road sign, a pedestrian, and so on, can generate multiple return points. For example, a 10-degree frame can include returns from one or more road signs, multiple vehicles located at various distances from the lidar device (which may be mounted on the autonomous vehicle) and moving with different speeds in different directions, a pedestrian crossing a roadway, walking along a sidewalk, or standing by the roadside, and many other objects. Segmenting (which may be performed by a perception system of the autonomous vehicle) a given point cloud into clusters that correspond to different objects can be useful in autonomous driving applications. Points that are close (e.g., are separated by a small angular distance and correspond to reflections from similar distances) can nonetheless belong to different objects. For example, a traffic sign and a pedestrian standing close to the sign can generate close return points. Similarly, a car moving along a bicycle in the adjacent lane can generate close return points.

Identification of points that correspond to different objects is typically performed using mapping of point clusters belonging to different frames, such as frames having consecutive time stamps. Specifically, a hypothesis can be made that a selected first set (cluster) of points of a frame identified by its time stamp t and a selected second set of points of frame $t+\Delta t$ belong to the same object (e.g. a car or a pedestrian). The first set of points is then mapped, using a suitable (e.g., best-fit) geometric transform, onto the second set of points and a determination is made whether the obtained mapping is within an acceptable accuracy, to assess whether the hypothesis is confirmed or invalidated, in which case a different hypothesis can be chosen and the process repeated. Such hypotheses selection and verification can be performed in parallel, with multiple hypotheses evaluated concurrently.

Various algorithms can be used for finding the optimal geometric transform, such as iterative closest point (ICP) algorithms that are capable of identifying the optimal transform using a series of steps (iterations) of a gradually improving convergence. The conventional ICP (or other mapping) algorithms are based on point mapping in coordinate space using angular (or linear lateral) coordinates and longitudinal (or radial) range (distance) values and are subject to a number of shortcomings. In particular, selecting smaller or larger time increments $\Delta t$ has respective shortcomings. For example, smaller $\Delta t$ can diminish the ability of the algorithm to invalidate incorrect hypotheses based on a small number of frames. Conversely, larger $\Delta t$ can reduce the speed of perception. Additionally, objects that are closely located can require a considerable time to distinguish from each other, using ToF lidar technology that can detect gradual separation of the objects over several (or more) consecutive time frames.

ToF lidars are typically used for ranging. ToFs can also be capable of determining the velocity (speed and direction of motion) of a return point by emitting two or more signals (as part of different sensing frames) in a quick succession and detecting the position of the reflecting surface as the surface moves between each additional frame. The intervals between successive signals can be short enough so that between consecutive signals (frames) the object does not change its position appreciably in relation to other objects of the environment, but still long enough to allow the lidar to accurately detect the changes in the object's position. However, ToF lidar devices are generally incapable of determining velocities of objects based on a single sensing frame.

Aspects and implementations of the present disclosure enable methods of identification of objects in environments of the autonomous vehicles using Doppler-assisted velocity sensing. Specifically, coherent lidars take advantage of phase information encoded into transmitted signals and carried by the emitted electromagnetic waves to the target and back and provide additional functionality unavailable in standard ToF lidar technology. A coherent lidar detects changes in the frequency (and the accompanying phase) of the reflected wave induced by the motion of the reflecting surface, a phenomenon known as the Doppler effect. The frequency/phase of the reflected wave is sensitive to the component of the velocity of the reflecting surface $V_r$ that is parallel to the direction of the wave propagation, herein referred to as the "radial" or "longitudinal" velocity. A coherent lidar allows, in addition to obtaining the range information, associating a radial velocity with the return points of the point cloud. This additional information, as described in more detail below, facilitates a more efficient object identification and tracking. In particular, the radial velocity data allows a more efficient formation of hypotheses. For example, based on the radial velocity $V_r$ of at least some points of the first set of the first frame and the locations of the corresponding points of the second set of the second frame, the perception system can quickly discard some of the hypotheses that are inconsistent with the measured velocities (e.g., a hypothesis can be discarded if the second set of points is shifted from the first set of points by the distances that are too large or too small in view of the measured velocities). Conversely, in some instances, a hypothesis can be formed based on a cluster of points having close radial velocities or having radial velocities that are different from each other yet consistent with an object (corresponding to the cluster of points) performing a combination of a linear motion and a rotation.

The use of the velocity information can also be advantageous for verification of formed hypotheses. For example, a hypothesis that was formed based on a single sensing frame can be tested (evaluated) when the second sensing frame data is collected: the locations of the points in the second frame can be compared to the locations of the points in the first frame and the hypothesis can be confirmed or invalidated based on how consisted the movement of the corresponding object is with the velocities of the points of the first frame. Similarly, if the hypothesis was formed based on mapping of the points of the first frame and points of the second frame, it can be subsequently verified using radial velocities of the subsequent (third, fourth, etc.) frame(s) by comparing the distances actually travelled by various points of the (hypothetical) object against the displacements as predicted by the velocity measurements.

FIG. 1 is a diagram illustrating components of an example autonomous vehicle (AV) 100 that uses Doppler-assisted object identification and tracking, in accordance with some implementation of the present disclosure. FIG. 1 illustrates operations of the example autonomous vehicle. Autonomous vehicles can include motor vehicles (cars, trucks, buses, motorcycles, all-terrain vehicles, recreational vehicle, any specialized farming or construction vehicles, and the like), aircraft (planes, helicopters, drones, and the like), naval vehicles (ships, boats, yachts, submarines, and the like), or any other self-propelled vehicles (e.g., sidewalk delivery robotic vehicles) capable of being operated in a self-driving mode (without a human input or with a reduced human input).

A driving environment 110 can include any objects (animated or non-animated) located outside the AV, such as roadways, buildings, trees, bushes, sidewalks, bridges, mountains, other vehicles, pedestrians, and so on. The driving environment 110 can be urban, suburban, rural, and so on. In some implementations, the driving environment 110 can be an off-road environment (e.g. farming or agricultural land). In some implementations, the driving environment can be an indoor environment, e.g., the environment of an industrial plant, a shipping warehouse, a hazardous area of a building, and so on. In some implementations, the driving environment 110 can be substantially flat, with various objects moving parallel to a surface (e.g., parallel to the surface of Earth). In other implementations, the driving environment can be three-dimensional and can include objects that are capable of moving along all three directions (e.g., balloons, leaves, etc.). Hereinafter, the term "driving environment" should be understood to include all environments in which an autonomous motion of self-propelled vehicles can occur. For example, "driving environment" can include any possible flying environment of an aircraft or a marine environment of a naval vessel. The objects of the driving environment 110 can be located at any distance from the AV, from close distances of several feet (or less) to several miles (or more).

The example AV 100 can include a sensing system 120. The sensing system 120 can include various electromagnetic (e.g., optical) and non-electromagnetic (e.g., acoustic) sensing subsystems and/or devices. The terms "optical" and "light," as referenced throughout this disclosure, are to be understood to encompass any electromagnetic radiation (waves) that can be used in object sensing to facilitate autonomous driving, e.g., distance sensing, velocity sensing, acceleration sensing, rotational motion sensing, and so on. For example, "optical" sensing can utilize a range of light visible to a human eye (e.g., the 380 to 700 nm wavelength range), the UV range (below 380 nm), the infrared range (above 700 nm), the radio frequency range (above 1 m), etc. In implementations, "optical" and "light" can include any other suitable range of the electromagnetic spectrum.

The sensing system 120 can include a radar unit 126, which can be any system that utilizes radio or microwave frequency signals to sense objects within the driving environment 110 of the AV 100. The radar unit can be configured to sense both the spatial locations of the objects (including their spatial dimensions) and their velocities (e.g., using the Doppler shift technology). Hereinafter, "velocity" refers to both how fast the object is moving (the speed of the object) as well as the direction of the object's motion. The term "angular velocity" refers to how fast the object is rotating around some axis as well as the direction of this axis of rotation. For example, a car that is making a left (right) turn has the axis of rotation pointed up (down) and the value of the angular velocity is equal to the rate of change of the angle of rotation (e.g., measured in radians per second).

The sensing system 120 can include one or more lidar sensors 122 (e.g., lidar rangefinders), which can be a laser-based unit capable of determining distances (e.g., using ToF technology) to the objects in the driving environment 110. The lidar sensor(s) can utilize wavelengths of electromagnetic waves that are shorter than the wavelength of the radio waves and can, therefore, provide a higher spatial resolution and sensitivity compared with the radar unit. The lidar sensor(s) can include a coherent lidar sensor, such as a frequency-modulated continuous-wave (FMCW) lidar sensor. The lidar sensor(s) can use optical heterodyne detection for velocity determination. In some implementations, the functionality of a ToF and coherent lidar sensor(s) is combined into a single (e.g., hybrid) unit capable of determining both the distance to and the radial velocity of the reflecting object. Such a hybrid unit can be configured to operate in an incoherent sensing mode (ToF mode) and/or a coherent sensing mode (e.g., a mode that uses heterodyne detection) or both modes at the same time. In some implementations, multiple lidar sensor(s) 122 units can be mounted on AV, e.g., at different locations separated in space, to provide additional information about a transverse component of the velocity of the reflecting object, as described in more detail below.

The lidar sensor(s) 122 can include one or more laser sources producing and emitting signals and one or more detectors of the signals reflected back from the objects. The lidar sensor(s) 122 can include spectral filters to filter out spurious electromagnetic waves having wavelengths (frequencies) that are different from the wavelengths (frequencies) of the emitted signals. In some implementations, the lidar sensor(s) 122 can include directional filters (e.g., apertures, diffraction gratings, and so on) to filter out electromagnetic waves that can arrive at the detectors along directions different from the retro-reflection directions for the emitted signals. The lidar sensor(s) 122 can use various other optical components (lenses, mirrors, gratings, optical films, interferometers, spectrometers, local oscillators, and the like) to enhance sensing capabilities of the sensors.

In some implementations, the lidar sensor(s) 122 can scan a 360-degree view, e.g., in a horizontal direction. In some implementations, the lidar sensor(s) 122 can be capable of spatial scanning along both the horizontal and vertical directions. In some implementations, the field of view can be up to 90 degrees in the vertical direction (e.g., with at least a part of the region above the horizon being scanned by the lidar signals). In some implementations, the field of view can be a full sphere (consisting of two hemispheres). For brevity and conciseness, when a reference to "lidar technology," "lidar sensing," "lidar data," and "lidar," in general, is made in the present disclosure, such reference shall be understood also to encompass other sensing technology that operate at generally in the near-infrared wavelength, but may include sensing technology that operates at other wavelengths as well.

The sensing system 120 can further include one or more cameras 129 to capture images of the driving environment 110. The images can be two-dimensional projections of the driving environment 110 (or parts of the driving environment 110) onto a projecting plane (flat or non-flat, e.g. fisheye) of the cameras. Some of the cameras 129 of the sensing system 120 can be video cameras configured to capture a continuous (or quasi-continuous) stream of images of the driving environment 110. The sensing system 120 can also include one or more sonars 128, which can be ultrasonic sonars, in some implementations.

The sensing data obtained by the sensing system 120 can be processed by a data processing system 130 of AV 100. For example, the data processing system 130 can include a perception system 132. The perception system 132 can be configured to detect and track objects in the driving environment 110 and to recognize the detected objects. For example, the perception system 132 can analyze images captured by the cameras 129 and can be capable of detecting traffic light signals, road signs, roadway layouts (e.g., boundaries of traffic lanes, topologies of intersections, designations of parking places, and so on), presence of obstacles, and the like. The perception system 132 can further receive the lidar sensing data (coherent Doppler data and incoherent ToF data) to determine distances to various objects in the environment 110 and velocities (radial and, in some implementations, transverse, as described below) of such objects. In some implementations, the perception system 132 can use the lidar data in combination with the data captured by the camera(s) 129. In one example, the camera(s) 129 can detect an image of a rock partially obstructing a traffic lane. Using the data from the camera(s) 129, the perception system 132 can be capable of determining the angular size of the rock, but not the linear size of the rock. Using the lidar data, the perception system 132 can determine the distance from the rock to the AV and, therefore, by combining the distance information with the angular size of the rock, the perception system 132 can determine the linear dimensions of the rock as well.

In another implementation, using the lidar data, the perception system 132 can determine how far a detected object is from the AV and can further determine the component of the object's velocity along the direction of the AV's motion. Furthermore, using a series of quick images obtained by the camera, the perception system 132 can also determine the lateral velocity of the detected object in a direction perpendicular to the direction of the AV's motion. In some implementations, the lateral velocity can be determined from the lidar data alone, for example, by recognizing an edge of the object (using horizontal scanning) and further determining how quickly the edge of the object is moving in the lateral direction. The perception system 132 can have a point cloud module (PCM) 133 to perform mapping of return points of different sensing frames in order to identify and track various objects in the driving environment 110. PCM 133 can be a velocity-assisted (Doppler-assisted) module that uses velocity data to augment range data for more efficient and reliable detection and tracking of objects, as described in more detail below.

The perception system 132 can further receive information from a GPS transceiver (not shown) configured to obtain information about the position of the AV relative to Earth. The GPS data processing module 134 can use the GPS data in conjunction with the sensing data to help accurately determine location of the AV with respect to fixed objects of the driving environment 110, such as roadways, lane boundaries, intersections, sidewalks, crosswalks, road signs, surrounding buildings, and so on, locations of which can be provided by map information 135. In some implementations, the data processing system 130 can receive non-electromagnetic data, such as sonar data (e.g., ultrasonic sensor data), temperature sensor data, pressure sensor data, meteorological data (e.g., wind speed and direction, precipitation data), and the like.

The data processing system 130 can further include an environment monitoring and prediction component 136, which can monitor how the driving environment 110 evolves with time, e.g., by keeping track of the locations and velocities of the animated objects (relative to Earth). In some implementations, the environment monitoring and prediction component 136 can keep track of the changing appearance of the environment due to motion of the AV relative to the environment. In some implementations, the environment monitoring and prediction component 136 can make predictions about how various animated objects of the driving environment 110 will be positioned within a prediction time horizon. The predictions can be based on the current locations and velocities of the animated objects as well as on the tracked dynamics of the animated objects during a certain (e.g., predetermined) period of time. For example, based on stored data for object 1 indicating accelerated motion of object 1 during the previous 3-second period of time, the environment monitoring and prediction component 136 can conclude that object 1 is resuming its motion from a stop sign or a red traffic light signal. Accordingly, the environment monitoring and prediction component 136 can predict, given the layout of the roadway and presence of other vehicles, where object 1 is likely to be within the next 3 or 5 seconds of motion. As another example, based on stored data for object 2 indicating decelerated motion of object 2 during the previous 2-second period of time, the environment monitoring and prediction component 136 can conclude that object 2 is stopping at a stop sign or at a red traffic light signal. Accordingly, the environment monitoring and prediction component 136 can predict where object 2 is likely to be within the next 1 or 3 seconds. The environment monitoring and prediction component 136 can perform periodic checks of the accuracy of its predictions and modify the predictions based on new data obtained from the sensing system 120.

The data generated by the perception system 132, the GPS data processing module 134, and the environment monitoring and prediction component 136 can be used by an autonomous driving system, such as AV vehicle control system (AVCS) 140. The AVCS 140 can include one or more algorithms that control how AV is to behave in various driving situations and environments. For example, the AVCS 140 can include a navigation system for determining a global driving route to a destination point. The AVCS 140 can also include a driving path selection system for selecting a particular path through the immediate driving environment, which can include selecting a traffic lane, negotiating a traffic congestion, choosing a place to make a U-turn, selecting a trajectory for a parking maneuver, and so on. The AVCS 140 can also include an obstacle avoidance system for safe avoidance of various obstructions (rocks, stalled vehicles, a jaywalking pedestrian, and so on) within the driving environment of the AV. The obstacle avoidance system can be configured to evaluate the size of the obstacles and the trajectories of the obstacles (if obstacles are animated) and select an optimal driving strategy (e.g., braking, steering, accelerating, etc.) for avoiding the obstacles.

Algorithms and modules of AVCS 140 can generate instructions for various systems and components of the vehicle, such as the powertrain and steering 150, vehicle electronics 160, signaling 170, and other systems and components not explicitly shown in FIG. 1. The powertrain and steering 150 can include an engine (internal combustion engine, electric engine, and so on), transmission, differentials, axles, wheels, steering mechanism, and other systems. The vehicle electronics 160 can include an on-board computer, engine management, ignition, communication systems, carputers, telematics, in-car entertainment systems, and other systems and components. The signaling 170 can include high and low headlights, stopping lights, turning and backing lights, horns and alarms, inside lighting system, dashboard notification system, passenger notification system, radio and wireless network transmission systems, and so on. Some of the instructions output by the AVCS 140 can be delivered directly to the powertrain and steering 150 (or signaling 170) whereas other instructions output by the AVCS 140 are first delivered to the vehicle electronics 160, which generate commands to the powertrain and steering 150 and/or signaling 170.

In one example, the AVCS 140 can determine that an obstacle identified by the data processing system 130 is to be avoided by decelerating the vehicle until a safe speed is reached, followed by steering the vehicle around the obstacle. The AVCS 140 can output instructions to the powertrain and steering 150 (directly or via the vehicle electronics 160) to 1) reduce, by modifying the throttle settings, a flow of fuel to the engine to decrease the engine rpm, 2) downshift, via an automatic transmission, the drivetrain into a lower gear, 3) engage a brake unit to reduce (while acting in concert with the engine and the transmission) the vehicle's speed until a safe speed is reached, and 4) perform, using a power steering mechanism, a steering maneuver until the obstacle is safely bypassed. Subsequently, the AVCS 140 can output instructions to the powertrain and steering 150 to resume the previous speed settings of the vehicle.

FIG. 2A is an illustration of a Doppler-assisted object determination and tracking 200 that utilizes point cloud mapping, as part of a perception system of an autonomous vehicle, in accordance with some implementations of the present disclosure. Depicted in FIG. 2A is AV 202 (which can be AV 100 or any other AV) approaching an intersection. The AV 202 has a sensor 206, which can be a lidar, such as a coherent lidar, an FMCW lidar, a hybrid coherent/ToF lidar, a combination of a coherent and incoherent lidar, etc., or any other device that allows to sense the radial velocity information in addition to the range (distance) information. The sensor 206 performs scanning of the driving environment of AV 202. In particular, the sensor 206 can sense multiple return points ("points") for each sensing frame (sensing data frame). The sensing frames can be separated by time increments $\Delta t$. The time increments refer to time differentials between signals emitted into (or returned from) the same direction, as different directions can be probed with signals at slightly different times. More specifically, $\Delta t$ can be a period of the sensor (e.g., lidar transmitter) revolution; and with N points around the 360-degree horizontal view, any two adjacent directions of sensing can be probed with the time lead/lag of $\Delta t/N$.

An object 210 (e.g., a car, a truck, a bus, a motorcycle, or any other object) is approaching the intersection and making a left turn, as depicted in FIG. 2A. Two consecutive locations of the AV, e.g., 204(1) and 204(2), corresponding to two consecutive lidar frames taken at times t and t+$\Delta t$ are shown. Similarly, the locations of object 210 for the two frames t and t+$\Delta t$ are shown as 212(1) and 212(2), respectively.

It should be understood that the displacement of AV 202 and object 210 shown in FIG. 2A between two consecutive frames is exaggerated for illustrative purposes and that, in reality, various objects can change their locations over the time increment $\Delta t$ much less significantly. For example, there can be numerous frames sensed by sensor 206 while object 210 completes the left-hand turn depicted in FIG. 2A.

Object 210 performs a combination of a translational motion and a rotational motion. For example, some reference point of the object 210 is translated by vector $\Delta \vec{R}$ and the object 210 is rotated around this reference point by angle $\Delta \phi$. (As explained below, and conductive to the efficacy of the described methods, the choice of the reference point is rather arbitrary). In a flat driving environment, it can be sufficient to describe rotational motion via a single-component value $\Delta \phi$, but in non-flat 3D (in particular, flying or nautical) environments, the rotation angle can be a vector $\Delta \vec{\phi}$ whose three components describe pitch angle, yaw angle, and roll angle, respectively. The angular velocity of the object 210 characterizes the rate at which the object 210 is rotating (turning), $\vec{\Omega}=\Delta \vec{\phi}/\Delta t$. The linear velocity of the reference point similarly determines the rate at which the object 210 is translating, $\vec{V}_O=\Delta \vec{R}/\Delta t$. Provided that the object 210 is rigid, the knowledge of the angular velocity and the linear velocity $\vec{V}_O$ of some reference point O (with coordinates $\vec{R}_O$) allows to determine velocity of any other point of the body according to the equation (herein referred to as the rigid body equation):

$$\vec{V}=\vec{V}_O+\vec{\Omega}\times(\vec{R}-\vec{R}_O).$$

The choice of the reference point O can be arbitrary since the same relation exists for any other reference point O' as $$\vec{V} = \vec{V}_O + \vec{\Omega} \times (\vec{R} - \vec{R}_{O'} - \vec{R}_O + \vec{R}_{O'}) = \vec{V}_{O'} + \vec{\Omega} \times (\vec{R} - \vec{R}_{O'}),$$

where $\vec{V}_{O'} = \vec{V}_O + \vec{\Omega} \times (\vec{R}_{O'} - \vec{R}_O)$ is the linear reference velocity of the reference point O'. Although the linear reference velocity changes when the reference point is changed, the angular velocity is independent of the choice of the reference point. This independence provides additional flexibility when point cloud mapping is performed.

Reference point O can be regarded as a center of object's rotation. A freedom to choose a reference point reflects a possibility to represent an arbitrary displacement of a rigid object via an infinite number of possible combinations of a rotation (about an arbitrarily chosen center of rotation but to the same angle and around the same axis) and a translation. (An exception is a purely translational motion.) Accordingly, in some implementations, it can be convenient to choose reference point O to be somewhere inside the object (albeit not necessarily chosen to be close to the object's geometric center or center of mass). In other implementations, it can be convenient to represent object's motion as a pure rotation around an axis parallel to $\vec{\Omega}$ (with no translations within the plane perpendicular to this axis) and a translation along this axis. Such choice of the rotation center (hereinafter referred to as "pure rotation" setup) is unique (up to arbitrary translation along the axis) and can be determined from the condition, $\vec{V}_{O'} = \vec{V}_O + \vec{\Omega} \times (\vec{R}_{O'} - \vec{R}_O) = 0$, which gives $$\vec{R}_{O'} = C\vec{\Omega} + \frac{1}{\Omega^2}(\vec{\Omega} \times \vec{V}_O + (\vec{\Omega} \times \vec{R}_O) \times \vec{\Omega}),$$

where C is an arbitrary number. (In instanced of a two-dimensional motion, C is zero.) At small angular velocities (when the object performs mostly translational motion), as seen from the last expression, rotation center is located at large distances. Accordingly, for the sake of numerical accuracy, in some implementations, distances from an object to its center of rotation can be limited, e.g., a pure rotation setup can be changed to a combined rotational-translational setup once it is determined that the center of rotation is farther than some predetermined distance (e.g., a certain number of the object's longest dimension). Alternatively biases against large distances to the center of rotation can be used, as described in more detail below.

As shown in FIG. 2A, at location 212(1) object 210 can reflect a number of signals (indicated by solid lines) output by the sensor 206 and generate a number of return points (shown with black circles) of the first frame. The return points should be understood as data entries (e.g., indexed by the angular directions of the output signals or in any other way) generated by the perception system 132 based on the measurements performed by sensor 206, as part of the sensing system 120. Each return point can include (or be associated with) distance r to the actual physical point of reflection and the radial velocity $V_r$ equal to the component of the velocity $\vec{V}$ along the direction (described by unit vector $\vec{n}$) towards the sensor 206: $V_r = \vec{V} \cdot \vec{n}$. In some implementations, only some of the return points can include the radial velocity values. For example, while ToF range measurements can be performed for each return point, only some (e.g., every fifth, tenth, and so on) of the points can be probed with the coherent lidar and include the velocity data. The radial velocity $V_r$ is the velocity measured in the reference frame of the AV 202. Accordingly, because in a general case the AV 202 is moving, the measured velocity $V_r$ can be different from the velocity of the respective physical point of reflection relative to the ground, which can then be determined by adding (in vector form) the velocity of the object 210 measured in the AV 202 frame to the velocity of the AV 202 with respect to the ground (which can be known independently, e.g., from speedometer/odometer data, map/GPS data, etc.).

At location 212(2) the object 210 can similarly reflect a new set of signals (indicated by dashed lines) output by the sensor 206 and generate a number of return points of the second frame. One or more mapping algorithms implemented by PCM 133 can determine a geometric transformation that maps the point cloud of the first frame onto the point cloud of the second frame. FIG. 2B illustrates a mapping 250 of a first point cloud 262 (e.g., corresponding to the first frame) to a second point cloud 264 (e.g., corresponding to the second frame), in accordance with implementations of the present disclosure. The mapping shown amounts to a geometric transformation of a point cloud associated with a rigid object, e.g., object 260. Mapping 250 is determined by identifying the translation vector $\Delta \vec{R}$ and the rotation angle $\Delta \vec{\phi}$ which, given the duration of the time increment $\Delta t$ also identifies the linear $\vec{V} = \Delta \vec{R}/\Delta t$ and angular $\vec{\Omega} = \Delta \vec{\phi}/\Delta t$ velocities of the object (e.g., average velocities over the time interval $\Delta t$). Mapping 250 can use the iterative closest point (ICP) algorithm which iteratively revises the transformation and minimizes an error metric (e.g., the mean squared error or some other pre-determined metric) based on the comparison of the transformed first point cloud 262 with the second point cloud 264 (or vice versa). In some implementations, other mapping algorithms can be used, such as the Kabsch algorithm, the Procrustes superimposition, and the like. Although only two sensing frames (with respective points clouds) are depicted for conciseness, similar mappings can be generated between various consecutive sensing frames (e.g., between the second frame and the third frame, between the third frame and the fourth frame, etc.) for both object identification and tracking.

With the recurring reference to FIG. 2A, as the object 210 is moving from location 212(1) to location 212(2), the return points in the second frame correspond to reflection surfaces of the object 210 that can be different from the surfaces causing reflections of the signals of the first frame. For example, as depicted in FIG. 2A, when parts of the rotating object 210 previously obscured come within a field of view of sensor 206, additional return points can be detected. Conversely, some of the previously exposed return points can be absent (as the respective physical reflecting surfaces disappear from view), and so on. To address such dynamic aspect of point clouds, the algorithms executed by PCM 133 can draw a bounding box, which can be a projection of a 3D bounding box onto the field of view. The projection of the bounding box dynamically evolves as the bounding box is being rotated relative to the field of view. Having set the bounding box around a point cloud (e.g., as part of a hypothesis formation), PCM 133 can map both the actual (currently visible) as well as currently obscured points in order to anticipate when such obscured points can come into the field of view, for faster and more efficient point cloud mapping.

Excluding or validating hypotheses using the radial velocity data can be performed before, after, or concurrently with point cluster mapping (e.g. ICP mapping). For example, to reduce computational costs of mapping, hypotheses that are inconsistent with the radial velocity data can be discarded prior to mapping. In some implementations, mapping can be performed for outlines of two point clouds. In some implementations, PCM 133 can retain those hypotheses whose point clouds pass the velocity verification and are amenable to a successful mapping, within a set alignment accuracy.

In one example implementation, point cloud mapping assisted by radial velocity data can be performed as follows. Perception system 132 can identify a first point cloud 262 (e.g., a source point cloud) obtained at a moment of time t and a second point cloud 264 (e.g., a target point cloud) obtained at a moment of time t+Δt. PCM 133 can make a hypothesis that associates points in the first point cloud 262 with points in the second point cloud 264 using various methods of mapping, such as ICP mapping. For example, among formed hypotheses can be a hypothesis that matches each point in the first point cloud to the closest to it point in the second point cloud. In some implementations, such a hypothesis can merely be only one of many hypotheses as motion of the underlying object can be such (especially over longer times) that points that map onto each other are not the closest points. For example, point A' of the second point cloud 264 can be closest to point B but is correctly mapped to point A of the first point cloud 262.

Having formed one or more hypotheses, PCM 133 can identify pairs of points (enumerated with index j) in the two clouds that are mapped onto each other $R_j(1) \rightarrow R_j(2)$. Additionally, PCM 133 can identify a set of fitting parameters $\{\beta\} = \beta_1, \beta_2 \ldots$ that parameterize a motion of a body (e.g., a rigid body) that corresponds to the hypothesized mapping. The parameters can include translational velocity, rotational velocity, center of rotation, etc. The number of parameters can depend on the motion that is being mapped. For example, a planar two-dimensional motion (e.g., motion of vehicles over a flat surface) can be characterized by a single angular velocity value (a rate of rotation around a vertical axis) whereas a three-dimensional motion (e.g., motion of flying objects) can be characterized by three components of the angular velocity. The table below provides examples of parameters that can be used to describe mappings of point clouds.

|  | 2D motion | 3D motion |
| --- | --- | --- |
| Arbitrary center of rotation | $\Omega_z$; $V_{Ox}$; $V_{Oy}$ | $\Omega_x$; $\Omega_y$; $\Omega_z$; $V_{Ox}$; $V_{Oy}$; $V_{Oz}$ |
| Pure rotation (fixed center of rotation) | $\Omega_z$, $R_{Ox}$, $R_{Oy}$ | $\Omega_x$; $\Omega_y$; $\Omega_z$; $R_{Ox}$; $R_{Oy}$; $V_{O\Omega}$ |

Here, the plane x'y' is perpendicular to the direction of the angular velocity $\vec{\Omega}$; $V_{O\Omega}$ is a component of the translational velocity along the direction of $\vec{\Omega}$.

Based on actual coordinates $R_j(1)$ of points at time t (first frame) and using the fitting parameters, e.g., $V_O$ and $\Omega$, PCM 133 can predict future coordinates $\tilde{R}_j(t+\Delta t)$ of the first point cloud at time t+Δt (e.g., time of second frame):

$$\tilde{R}_j(1 \rightarrow 2) = R_j(1) + V_O \Delta t + \Omega \times [R_j(1) - R_O] \Delta t,$$

where for ease of notation, vectors are denoted with bold-faced letters rather than with arrows. Likewise, in some implementations, PCM 133 can also make a backward "prediction" of the past locations (at time of first frame) of the coordinates of points in the second point cloud:

$$\tilde{R}_j(1 \leftarrow 2) = R_j(2) - V_O \Delta t - \Omega \times [R_j(2) - R_O] \Delta t.$$

Having made such predictions, PCM 133 can compare how well predicted coordinates $\tilde{R}_j(1 \rightarrow 2)$ of the first point cloud at a future instance of time approximate actual coordinates of the points in the second cloud $R_j(2)$ (as obtained by the sensing system 120). The accuracy of prediction can be characterized by a forward-looking residual $$S^> = \sum_j S_j^>,$$

that is a sum of residuals for various points j. The residuals $S_j^>$ can include a number of contributions. For example, $S_j^>$ can include a penalty for errors in predicted coordinates:

$$S_j^>(\text{coord}) = a[R_{j\parallel}(2) - \tilde{R}_{j\parallel}(1 \rightarrow 2)]^2 + b[R_{j\perp}(2) - \tilde{R}_{j\perp}(1 \rightarrow 2)]^2,$$

where $R_{j\parallel}$ denotes a radial component of the radius-vector (radial distance) to point j and $R_{j\perp}$ denotes components of the same radius vector in the transverse plane. Depending on whether the motion is two-dimensional or three-dimensional, $R_{j\perp}$ can have one component or two components, respectively. Weights a and b can be different from each other, in some implementations, in order to take into account that radial and transverse distances can be known with different precision. In some implementations, weights a and b can be taken to be equal to each other.

The residuals $S_j^>$ can further include a penalty for errors in predicting of radial velocities $V_{j\parallel}$, which can be known from coherent lidar sensor(s):

$$S_j^>(\text{vel}) = c[R_{j\parallel}(1) - R_{j\parallel}(2) + V_{j\parallel}(1)\Delta t]^2,$$

where $R_{j\parallel}(1) + V_{j\parallel}(1)\Delta t$ is a predicted radial distance at time t+Δt (based on previously measured radial distance $R_{j\parallel}(1)$ and anticipated increment $V_{j\parallel}(1)\Delta t$. Weight c can differ from weights a and b. In some implementations, relative values of a and b and c can depend on relative precisions with which radial distances, azimuthal distances, and radial velocities can be known. The total residuals $S_j^>$ can, therefore, be represented as a sum, $$S_j^> = S_j^>(\text{coord}) + S_j^>(\text{vel}).$$

In some implementations, backward-looking residuals can similarly be defined. For example, backward-looking residuals $$S^< = \sum_j S_j^<,$$

can similarly include a penalty for errors in predictions of coordinates, $$S_j^<(\text{coord}) = a[R_{j\parallel}(1) - \tilde{R}_{j\parallel}(1 \leftarrow 2)]^2 + b[R_{j\perp}(1) - \tilde{R}_{j\perp}(1 \leftarrow 2)]^2,$$

and can also include a penalty for errors in predictions of radial velocities which can be known from lidar sensing system:

$$S_j^<(\text{vel}) = c[R_{j\parallel}(2) - R_{j\parallel}(1) - V_{j\parallel}(2)\Delta t]^2,$$

where $R_{j\parallel}(2)-V_{j\parallel}(2)\Delta t$ is a "predicted" radial distance at the past time t based on subsequently measured radial distance $R_{j\parallel}(2)$ and decrement $-V_{j\parallel}(2)\Delta t$. The total backward-looking residuals $S_j^<$ can be a sum $S_j^< = S_j^<(\text{coord}) + S_j^<(\text{vel})$. The total residual error of the mapping can be the sum $S(\{\beta\}) = S^> (\{\beta\}) + S^<(\{\beta\})$, whose optimization (e.g., minimization) can determine the optimal values of the fitting parameters, e.g., $\{\beta\} = V_O, \Omega, R_O$. In some implementations, instead of defining forward-looking $S_j^<(\text{vel})$ and backward-looking residual $S_j^<(\text{vel})$ velocity errors, a combinet error that uses the average velocity values can be used, e.g., $$S_j(vel) = c[R_{j\parallel}(1) - R_{j\parallel}(2) + \Delta t(V_{j\parallel}(1) + V_{j\parallel}(2))/2]^2.$$

Because the residual error S is a non-linear function of the fitting parameters $\beta_k$, optimization of S can be performed using various iterative methods, such as gradient descent method, Gauss-Newton method, Levenberg-Marquart method, and the like. For example, in the gradient descent method, parameters $\beta_k$ are iterated ($\beta_k \rightarrow \beta_k + \Delta\beta_k$) in the direction defined by the gradient $\partial S / \partial \beta_k$, which is expressed via the Jacobian matrix $J_{jk} = \partial S_j / \partial \beta_k$. At each iteration of the gradient descent method, a system of linear equations (in matrix form)

$$\lambda \Delta\beta = J^T \Delta S,$$

determines the vector of fitting parameter increments $\Delta\beta = (\Delta\beta_1, \Delta\beta_2, \ldots)$ based on the residual errors occurring at the respective iterations, $\Delta S = (\Delta S_1, \Delta S_2, \ldots)$; a tunable parameter $\lambda$ can be chosen for maximum accuracy, fastest convergence, or based on other considerations.

In Gauss-Newton method, a local minimum can be determined at each iteration using a system of linear equations:

$$(J^T J)\Delta\beta = J^T \Delta S.$$

In Levenberg-Marquart method (damped Gauss-Newton method), increments can be determined at each iteration using a system of equations that interpolate between equations in the gradient descent and Gauss-Newton methods:

$$(J^T J + \lambda 1)\Delta\beta = J^T \Delta S.$$

Iterations can be continued until a sufficient degree of convergence is achieved, e.g., when further improvement from additional iterations is below a predetermined target level. The determined optimal fitting parameters $\{\beta\}_{min}$ can approximate a minimum residual error $S_{min} = S(\{\beta\}_{min})$ for the specific hypothesis under consideration. In some implementations, if the obtained residual error $S_{min}$ is within a target range, PCM 133 can accept the hypothesis as a current working hypothesis. In other implementations, PCM 133 can form multiple hypotheses and perform the mapping procedure described above for each of the formed hypothesis with a hypothesis having the smallest minimum residual error accepted as the current working hypothesis. Different hypotheses can include different associations of points in the first point cloud to points in the second point cloud. In some implementations, various hypotheses can involve different number of points. For example, some points can be included in some hypotheses but excluded from other hypotheses. In some implementations, if hypotheses include different number of points, the respective determined minimum residual errors $S_{min}$ can be normalized (e.g., divided by the number of points) prior to comparison with other hypotheses.

In some implementations, rather than selecting a single working hypothesis, PCM 133 can maintain multiple hypotheses for subsequent verification. For example, hypotheses that are maintained can be subsequently verified using a third point cloud from frame $t+2\Delta t$, a fourth frame $t+3\Delta t$, and so on. The mapping can be performed between any (or each) pair of consecutive frames until a final hypothesis is confirmed. In some implementations, PCM 133 can also identify (e.g., using a shape of the point cloud) a type of the object (e.g., a car, a truck, a bicycle, a road sign, etc.). In some implementations, PCM 133 can continue mapping point clouds of subsequent frames for object tracking, after the object has been identified.

In some implementations, residual error $S(\{\beta\})$ can include some but not all of the above-described contributions. For example, in some implementations, the coordinate error S(coord) can be included in residual error whereas the velocity error S(vel) can initially not be included. Instead, S(vel) can be used for verification of hypotheses. Specifically, after hypotheses are formed and mapping is performed with one or more hypotheses selected as viable possible hypotheses of point cloud mapping, S(vel) can be computed using the determined optimal sets of parameters for the respective hypotheses. Hypotheses that result in a residual error S(vel) that exceeds a certain predetermined threshold can be discarded. Hypotheses that have the residual error S(vel) that is below the threshold, can be maintained (e.g., for subsequent verification using additional frames). In some implementations, a hypothesis with the lowest residual error S(vel) can be accepted (and used for object tracking/subsequent verification using additional frames). In some implementations, instead of using radial velocity for computing residual errors, such as S(vel), radial velocity data can be used to filter out hypothesis that are inconsistent with the radial data. Specifically, an error, $$E = \frac{1}{N} \sum_j [R_{j\parallel}(1) - R_{j\parallel}(2) + V_{j\parallel}\Delta t]^2,$$

can be computed for each mapping hypothesis $1 \rightarrow 2$ and those hypotheses for which the error exceeds a preset threshold (e.g., determined empirically), $E > E_T$, can be discarded. In some implementations, velocity data can be used both for initial exclusion of non-viable hypotheses and for evaluating the retained hypotheses (e.g., using S(vel) residuals, as described above).

In various implementations, ambiguity of choosing the center of rotation versus identifying the translational velocity (both in the plane perpendicular to the direction of the angular axis) can be addressed using a variety of approaches. In one implementation, rotation center can be chosen randomly, e.g., near a center of the first point cloud (or the second point cloud). In some implementations, the mapping performed can be biased in a way that favors smaller translational velocities or, alternatively (depending on preferred settings), smaller radii of rotation. For example, the residual forward-looking error can include a contribution $$S(\text{center}) = Nd[V_{0\perp}]^2 + g\sum_j [R_{j\perp}(1) - R_{O\perp}]^2 + g\sum_j [R_{j\perp}(2) - R_{O\perp}]^2,$$

where d and g are biases disfavoring, respectively, high translational velocities and high distances to the center of rotation (from the two point clouds), and N is the number of points in the hypothesis. Higher values of d favor pure rotation setups whereas higher value of g favor centers of rotation that are close to a center of the point cloud(s). Specific values of d and g can be chosen empirically, e.g., by maximizing resulting accuracy and efficiency of point cloud mapping. In some implementations, one (or both) of the coefficients d and g can be small or zero. A small but nonetheless non-zero coefficient g can prevent $R_O$ from becoming too large and thus can help avoiding a situation of large $R_O$ but small $\Omega$ while the product $R_O\Omega$ is being neither small nor large, in which errors in $\Omega$ can be amplified by large values $R_O$.

Figure 3:
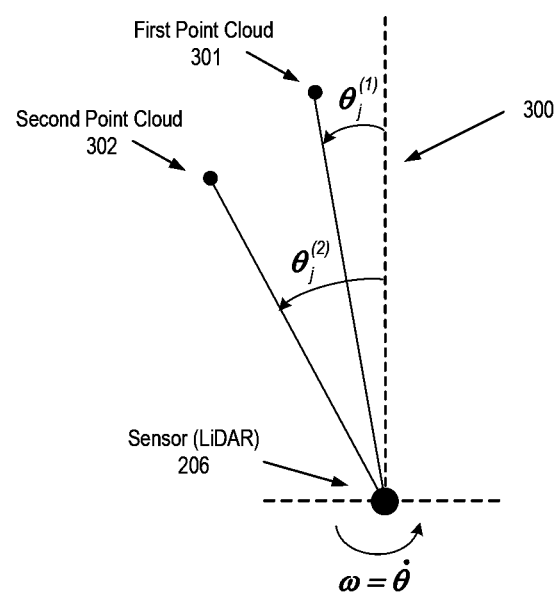
FIG. 3 is an illustration of a rolling shutter correction, for precise point cloud mapping, as part of a perception system of an autonomous vehicle, in accordance with some implementations of the present disclosure.

FIG. 3 is an illustration of a rolling shutter correction, for precise point cloud mapping, as part of a perception system of an autonomous vehicle, in accordance with some implementations of the present disclosure. In some implementations, a time increment between detection of a point in the first cloud and a corresponding point in the second cloud can differ from the time separation $\Delta t$ between different sensing frames. For example, while lidar sensor 206 can be probing the same spatial directions with period $\Delta t$ (e.g., the lidar transmitter can be rotating with angular velocity $\dot\theta = \omega = 2\pi/\Delta t$), different spatial direction can receive attention of lidar sensor at different times within one period of lidar transmitter revolutions (rolling shutter). Accordingly, motion of an object which generates return points (reflections) can lead to time shifts between consecutive frames that are different from $\Delta t$. For example, j-th point 301 of the first point cloud can be identified (during cloud point mapping, e.g., as part of a formed hypothesis) as mapping on a point 302 of the second point cloud. Although some reference direction is probed at times t (first frame) and $t+\Delta t$ (second frame), j-th point 301 of the first point cloud can be probed at a time $t+\theta_j^{(1)}/\omega$ that differs from time t by an angle lag (or lead, depending on the relative position to the reference direction) determined by the angular coordinate $\theta_j^{(1)}$ of j-th point 301 of the first point cloud. Likewise, j-th point 302 of the second point cloud can be probed at a time $t+\Delta t+\theta_j^{(2)}/\omega$ that differs from time $t+\Delta t$ by an amount determined by the angular coordinate $\theta_j^{(2)}$ of j-th point 302 of the second point cloud. As a result, the time difference between detection of the two points can be $\Delta t+\delta t_j$, e.g., modified by a point-specific correction $\delta t_j = (\theta_j^{(2)}-\theta_j^{(1)})/\omega$ whose magnitude and sign can depend on the speed and direction of motion of j-th point. For additional precision in point cloud mapping, such correction can be taken into account during mapping. For example, predicted locations of the points of the first point cloud at the time of the second data frame can be determined using modified times, $$\tilde{R}_j(1\to 2) = R_j(1)+V_O(\Delta t+\delta t_j)+\Omega\times[R_j(1)-R_O](\Delta t+\delta t_j),$$

while the residual error in radial velocity can be computed according to:

$$S_j^>(vel) = c[R_{j\parallel}(1)-R_{j\parallel}(2)+V_{j\parallel}(1)\times(\Delta t+\delta t_j)]^2.$$

Similar modifications can be made to other quantities (e.g., backward-looking) that are encountered during mapping. The corrections $\delta t_j$ can be positive, negative, or zero, depending on a specific point in the cloud.

Figures 4A, 4B:
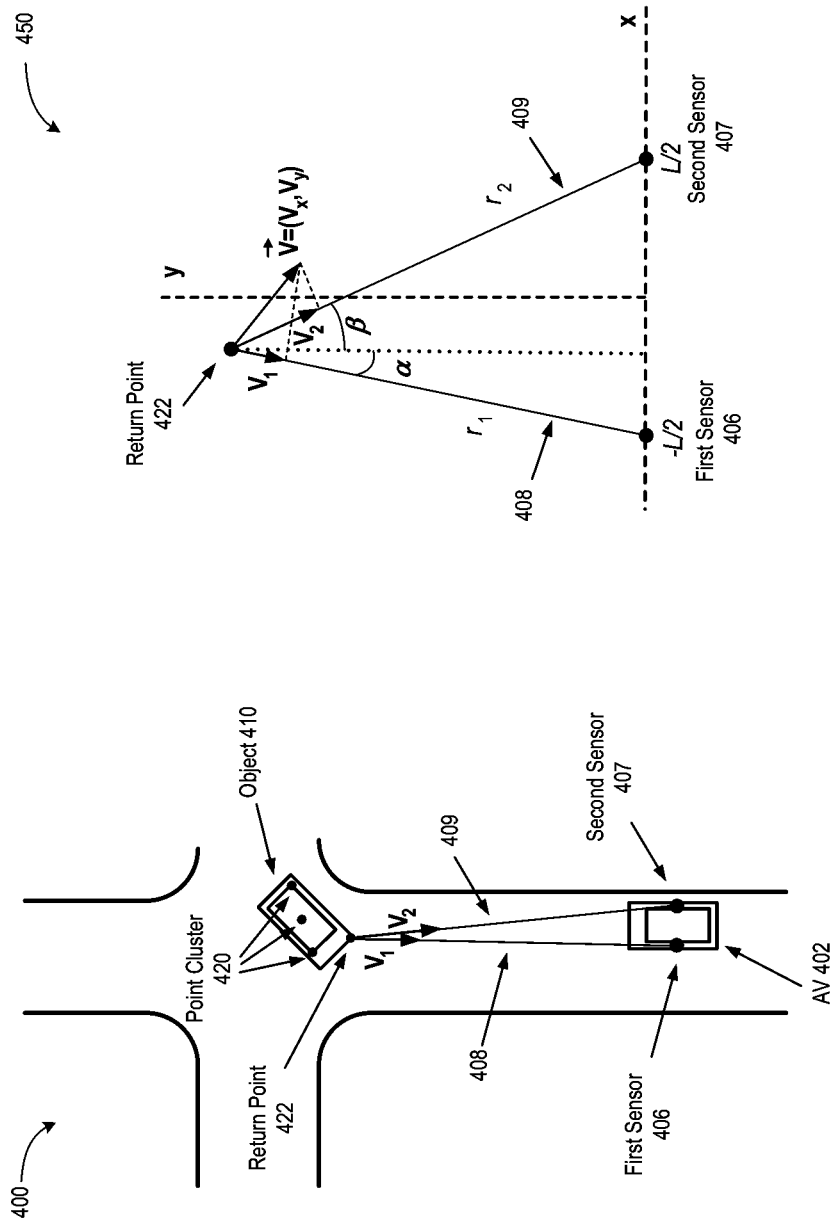
FIG. 4A is an illustration of a double sensor setup that utilizes point cloud mapping, as part of a perception system of an autonomous vehicle, in accordance with some implementations of the present disclosure.
FIG. 4B is an illustration of a determination of the lateral velocity associated with a return point using a double lidar triangulation scheme, in accordance with some implementations of the present disclosure.

FIG. 4A is an illustration of a double lidar setup 400 that utilizes point cloud mapping, as part of a perception system of an autonomous vehicle, in accordance with some implementations of the present disclosure. Depicted in FIG. 4A is AV 402 that has multiple lidar sensors (two are shown for specificity), such as a first sensor 406 and a second sensor 407, which can be any type of a coherent (or a combination of a coherent and incoherent) lidar devices capable of sensing the distance to a reflecting surface and the radial velocity of the reflecting surface of an object in the driving environment. The sensors 406 and 407 can performs scanning of the driving environment and generate return points corresponding to various objects. Each sensor can output signals that have imparted phase signatures (e.g., chirps or any other phase or frequency modulation features) that are unique for the sensor, so that the return signals from the sensors do not interfere with each other. Sensors 406 and 407 can be located at some distance (the baseline distance) from each other to improve lateral velocity resolution. In some implementations, the baseline distance can be made as large as practical (e.g., as limited by the length or width of AV 402). In some implementations, because lateral velocity resolution is maximal in the direction perpendicular to the baseline and minimal in the direction parallel to the baseline, more than two sensors can be utilized, placed in a non-collinear (e.g., triangular) arrangement. For example, a third sensor can be located near the midline of AV 402 (e.g., near the front or back of the vehicle).

In some implementations, a processing logic of the sensing system (e.g., sensing system 120) can synchronize the sensing frames of sensor 406 and sensor 407 so that the sensing signals are output at the same instances of time, e.g., at t, $t+\Delta t$, $t+2\Delta t$, $t+3\Delta t$, etc. In other implementations the sensing frames can be staggered (for example, to reduce possible interference or to improve temporal resolution) so that one sensor outputs signals at times t, $t+\Delta t$, $t+2\Delta t$, $t+3\Delta t$, whereas the other sensor outputs sensing signals at times $t+\Delta t/2$, $t+3\Delta t/2$, $t+5\Delta t/2$, and so on. Each sensor can detect its respective point cloud which can be—due to different positioning and timing of the sensing frames—somewhat different from the point cloud of the other sensor(s) even at the same times. A processing logic of the perception system (e.g., perception system 132) can identify, for each point of the first sensor cloud $\vec{R}_1$, the closest point of the second sensor cloud $\vec{R}_2$ and associate the two points with the same reflecting part of the object 410. In some implementations, the processing logic can approximate that the reflecting part is located at the halfway point, $(\vec{R}_1+\vec{R}_2)/2$. Shown in FIG. 4A is a point cluster 420 corresponding to the object 410 (only one point cluster is shown for the sake of conciseness, e.g., as detected by the first sensor 406).

Because the two sensors have different locations, the radial velocity $V_1$ measured along the first radial direction 408 by the first sensor 406 for a return point 422 of the point cluster 420 can be different from the radial velocity $V_2$ measured along the second radial direction 409 for the same (or close) return point of the cluster sensed by the second sensor 407. The difference $V_1-V_2$ is indicative of the lateral velocity of the return point 422. When $V_1=V_2$, the lateral velocity of the return point 422 is zero (within the measurement accuracy) whereas a situation of $V_1>V_2$ (or vice versa, $V_1<V_2$) is indicative of the return point 422 moving to the left (or right). FIG. 4B is an illustration of a determination of the lateral velocity associated with a return point using a double lidar triangulation scheme 400, in accordance with some implementations of the present disclosure. Shown is the x-axis that coincides with the baseline between the first sensor 406 and the second sensor 407 which are located at distance b from each other. The y-axis is perpendicular to the x-axis with the origin of the coordinate system located at the middle point between the sensors. (Any other choice of the coordinate axes can be used by the processing logic, depending on an implementation.) As shown, the first sensor 406 can be capable of determining a first distance $r_1$ to the return point 422, the angular direction $\alpha$ to the return point, and the radial velocity $V_1$. Likewise, the second sensor 407 can be capable of determining a second distance $r_2$ from the second sensor to the return point 422, the angular direction β to the return point, and the respective radial velocity $V_2$. Assuming that the velocity is pointed within the xy-plane (which is the most common situation in driving applications), the components of the velocity $\vec{V}=(V_x,V_y)$ can be determined based on the fact that the projection of the velocity onto the direction 408 is $V_1$ and onto the direction 409 is $V_2$ (as depicted with dashed lines). Specifically, from $$V_1 = -V_x \sin\alpha - V_y \cos\alpha,$$

$$V_2 = V_x \sin\beta - V_y \cos\beta,$$

it can be concluded that the lateral velocity is $$V_x = \frac{V_2 \cos\alpha - V_1 \cos\beta}{\sin(\alpha+\beta)} \approx \frac{L}{r}(V_2 - V_1),$$

where the approximation applies in the instances of small angles α and β for which $\cos\alpha \approx \cos\beta \approx 1$ and $\sin(\alpha+\beta) \approx \alpha+\beta \approx L/r$, where r is any of the distances $r_1$ or $r_2$ (which are, to the degree of accuracy used, almost the same). In a similar fashion, three or more lidar sensors can determine all three components of the velocity $\vec{V}=(V_x,V_y,V_z)$ associated with a return point. Such a determination can be especially advantageous in autonomous flying or nautical applications involving objects capable of moving in all three directions.

Lateral velocity data obtained using the multi-sensor setup can be used for hypotheses formation as well as the subsequent verification. In one implementation, the lateral velocity data can be used to augment evaluation of hypotheses based on the radial velocity field, as disclosed in relation to FIGS. 2A-B. Based on the lateral velocity data, PCM 133 can separate the objects that have similar radial velocities but distinct lateral velocities (e.g., vehicles passing each other in opposite directions). In the instances where the lateral velocities of different objects are sufficiently distinct, a viable hypothesis can be formed based already on a single sensing frame. In some instances, ability of the PCM 133 to use lateral velocity data can be range-specific. This can be predicated on the fact that the accuracy of the lateral velocity determination can be less than the accuracy of the radial velocity measurements. According to the equation for $V_x$ obtained above, if the radial velocity is known with precision $\delta V_r$ (meaning that measured value $V_r$ indicates that the actual velocity is within the $[V_r-\delta V_r, V_r+\delta V_r]$ interval) and assuming that the distance r is known exactly or with a high precision, the triangulation-based measurement of the lateral velocity illustrated in FIG. 4B has accuracy $$\delta V_x = \frac{L}{r}\delta V_r,$$

For example, if $\delta V_r=0.1$ m/s, the lidar sensors 406 and 407 are located at distance L=1.2 m, the accuracy of the lateral velocity determination at distance r=60 m would be $\delta V_r=5.0$ m/s., The accuracy would be higher (lower) for larger (smaller) distances. Such precision can be quite satisfactory to distinguish (based on a single sensing frame) vehicles that move in opposite directions or to distinguish a car and a bicycle (pedestrian) regardless of the direction of their motion.

In some implementations, lateral velocity data can be used for cloud point mapping (as described in relation to FIGS. 2A-B) for hypotheses formation and/or verification in a similar manner how radial velocity is used. For example, lateral velocity can be used as a constraint on possible mappings, quantified with one or more additional residual error, e.g., a forward-looking lateral velocity error, $$S_j^>(lat) = h[X_j(t+\Delta t) - X_j(t) - V_{jx}(t)\Delta t]^2,$$

and similarly for the backward-looking error, $$S_j^<(lat) = h[X_j(t) - X_j(t+\Delta t) + V_{jx}(t+\Delta t)\Delta t]^2$$

with a coefficient h describing a weight assigned to an error of the lateral velocity. In some implementations, weight h can be smaller than the weight c assigned to the errors in radial velocity, for example in the inverse proportion to the ratio of the respective accuracies in determination of the lateral velocity and the radial velocity, $h/a \sim (\delta V_r/\delta V_x)^2$, where the sign ~ indicates an order-of-magnitude estimate rather than exact identity.

In some implementations, various other evaluation metrics can be designed to evaluate errors in point cloud mapping. For example, while quadratic residuals are described in relation to the above implementations, any one or more functions (e.g., monotonic functions) can be used to quantify errors in coordinate matching, radial velocity matching, lateral velocity matching, as well as biases used in identifying the translational velocity and the center of rotation.

In some implementations, evaluation metrics, such as weights a (given to radial distance mismatches), b (given to lateral distance mismatches), c (given to radial velocity mismatches), h (given to lateral velocity mismatches), and biases, such as d (against large translational velocities) and g (against large radii of rotations), or other metrics used in the evaluation measures, can be determined using a machine learning model. More specifically, the model can be trained using a number of point clouds and two or more sensing frames having respective point clouds with correct point associations used as training (target) mappings. The correct associations can be marked up by a human operator/developer, or previously obtained using various point cloud mapping algorithms (such as ICP), or any combinations thereof. Evaluation metrics can be determined during training of the machine learning models (e.g., neural networks).

After one or more objects in the sensing frames are identified and the information about the identified objects and their motion is provided by the data processing system 132 to the AVCS 140, the AVCS 140 can determine the driving path of the AV and provide corresponding instructions (e.g., speed, acceleration, braking, steering instructions and the like) to the powertrain and steering 150 and vehicle electronics 160 in view of the motion of the identified objects.

Figure 5:
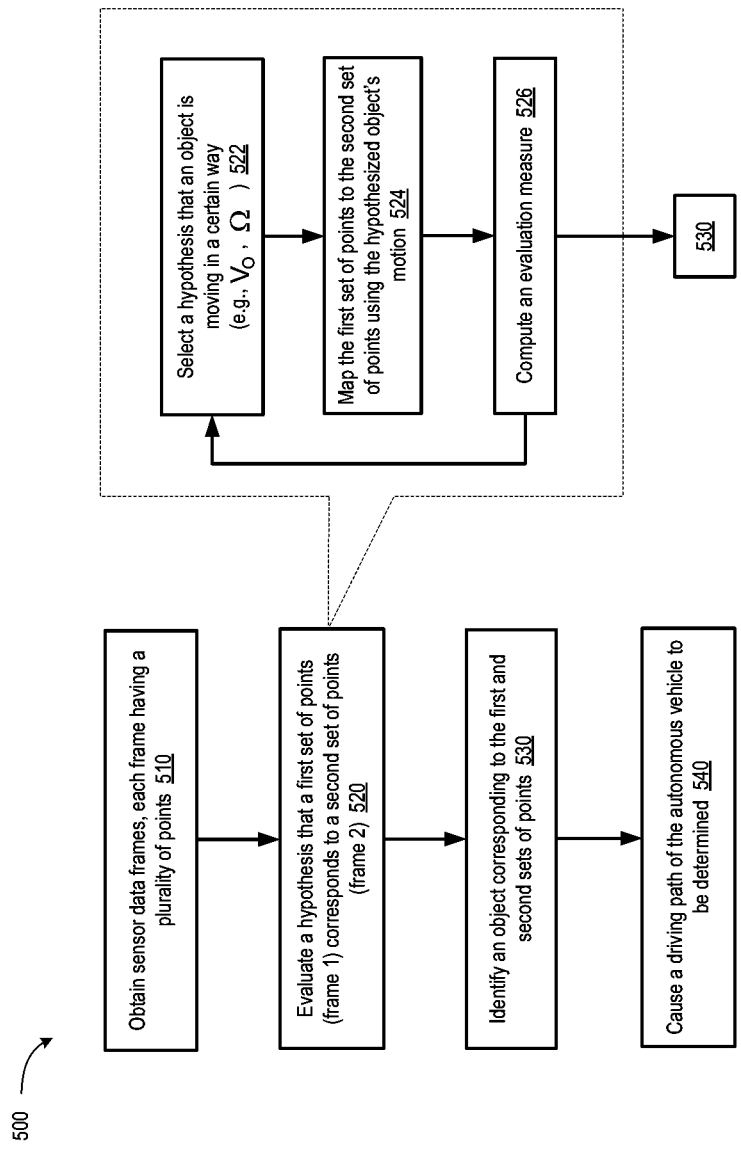
FIG. 5 depicts a flow diagram of an example method of using Doppler-assisted object identification and point cloud tracking for autonomous driving vehicle applications, in accordance with some implementation of the present disclosure.

FIG. 5 depicts a flow diagram of an example method 500 of using Doppler-assisted object identification and point cloud tracking for autonomous driving vehicle applications, in accordance with some implementation of the present disclosure. Method 500, as well as method 600 described below, and/or each of their individual functions, routines, subroutines, or operations can be performed by a computing device, having one or more processing units (CPU) and memory devices communicatively coupled to the CPU(s). In certain implementations, methods 500 and 600 can be performed by a single processing thread. Alternatively, methods 500 and 600 can be performed by two or more processing threads, each thread executing one or more individual functions, routines, subroutines, or operations of the method. In an illustrative example, the processing threads implementing method 500 can be synchronized (e.g., using semaphores, critical sections, and/or other thread synchronization mechanisms). Alternatively, the processing threads implementing methods 500 and 600 can be executed asynchronously with respect to each other. Various operations of methods 500 and 600 can be performed in a different order compared with the order shown in FIGS. 5 and 6. Some operations of the methods can be performed concurrently with other operations. Some operations can be optional.

Method 500 can be directed to systems and components of an autonomous driving vehicle, such as the autonomous vehicle 100 of FIG. 1. Method 500 can be used to identify and track objects present in the driving environment by the data processing system 130, using the sensing data obtained by the sensing system 120. The information about the identified objects can be provided to the autonomous vehicle control system 140. Method 500 can include, obtaining, at block 510, by a computing device, a plurality of sensing data frames of an environment around an AV. Each of the plurality of sensing data frames can include a plurality of points. A point corresponds to a reflection, from a surface of an object of the environment, of a signal emitted by a sensing system of the AV. Each point can include various data, such as a timestamp of the sensing frame and coordinates of the reflecting surfaces. The coordinates can include a distance to the respective reflecting surface and angles specifying directions to the reflecting surface (or any other value than unambiguously identify the location of the reflecting surface). At least some of the points can further include a velocity data for the respective reflecting surface; the velocity data can include the radial velocity of the reflecting surface. Each point can further include intensity of the reflected signal, polarization of the reflected signal, and so on. The radial distance can be determined from the lidar data whereas the angles can be independently known from a synchronizer data, a clock data, e.g., based on the known frequency of rotation of the sensing system's transmitter within the plane of rotation (e.g., horizontal plane). The velocity data can be obtained by the sensing system, which can include a coherent light detection and ranging device (lidar) capable of detecting the radial velocity using, e.g., Doppler-assisted sensing. In some implementations, the coherent lidar can be a frequency-modulated continuous-wave (FMCW) lidar and the signals emitted by the sensor can include phase-modulated or frequency-modulated electromagnetic waves. The sensing system can also be capable of concurrently emitting various other signals, such as pulsed signals, which can be used for ToF distance measurements. In some embodiments, the sensor can include separate ToF lidar and a coherent lidar, each emitting separate signals that can be synchronized, mixed, and transmitted along the same optical paths.

Various sensing frames can correspond to different cycles (e.g., revolutions) of the transmitter(s) of the sensing system. For example a first sensing frame can correspond to a first cycle, a second sensing frame can correspond to a different (e.g., earlier or later) cycle. The terms "first" and "second" should be understood as identifiers only and should not presuppose a specific order. In particular, there can be an arbitrary number of intervening frames between the first frame and the second frame.

In some implementations, the sensing system of the AV can include multiple sensors. For example, the sensing system can include a first sensor (e.g., sensor 406) capable of sensing velocities of objects of the environment. As measured by the first sensor, the velocity data for the respective reflecting surface can include a first component of a velocity of the respective reflecting surface along a first direction from the first sensor to the respective reflecting surface. Furthermore, the sensing system can include a second sensor (e.g., sensor 407) capable of sensing velocities of the objects of the environment. As measured by the second sensor, the velocity data for the respective reflecting surface can include a second component of the velocity of the respective reflecting surface along a second direction from the second sensor to the respective reflecting surface.

At block 520, method 500 can continue with a computing device (e.g., a device executing software instructions issued by PCM 133 as part of the perception system 132) evaluating a hypothesis that a first set of points from a first sensing data frame corresponds to a second set of points from a second sensing data frame. In some implementations, the first set of points and the second set of points can be selected (e.g., by the perception system) based on the spatial proximity of selected points in space, on the proximity of the velocity values associated with the points, using various segmentation algorithms, or by any other selecting procedures. The first set of points and the second set of points can be identified as part of a hypothesis that such points correspond to a single object. In some implementations, evaluating the hypothesis includes identifying the first set of points as having the velocity data consistent with a rigid body performing a combination of a translational motion and a rotational motion.

As shown schematically by the blowout section of FIG. 5, evaluating the hypothesis can include selecting, at block 522, a hypothesis that an object (corresponding to the first set of points of the first frame) is moving in a certain way, e.g., as can be specified by a set of fitting parameters. The fitting parameters can include a degree of translation of a rigid body (such as the object's translational velocity $\vec{V}$) and/or a degree of rotation of the rigid body (such as the object's angular velocity $\vec{\Omega}$, center of rotation, and so on).

At block 524, method 500 can continue with the computing device mapping, the first set of points to the second set of points. For example, mapping the first set of points to the second set of points can include using the iterative closest point algorithm. In some implementations, mapping the first set of points to the second set of points can include determining, based on the fitting parameters, locations of the first set of points after a time increment corresponding to a time difference between the first sensing data frame and the second sensing data frame (forward-looking inference). Similarly, in some implementations, mapping the first set of points to the second set of points can include inferring, based on the fitting parameters, locations of the second set of points prior to a time decrement corresponding to the time difference between the second sensing data frame and the first sensing data frame (backward-looking inference). In some implementations, mapping the first set of points to the second set of points is performed in view of the velocity data (e.g., radial velocity data) for at least some points of the first set of points and/or the second set of points. In some implementations, mapping the first set of points to the second set of points includes determining, based on the velocity data, a lateral velocity of a respective reflecting surface. The lateral velocity can be determined using velocity data obtained by the first sensor and the second sensor, e.g., as described in relation to FIGS. 4A and 4B.

At block 526, the computing device can determine, based on performed mapping, an evaluation measure for the hypothesis. The evaluation measure can be a value (or a plurality of values) that characterizes how closely the predicted (e.g., using the velocity value(s) associated with the points of the first and/or second sets) motion of the hypothesized object matches (aligns) with the first set of points and the second set of points. For example, evaluation measure can depend on a mismatch between the inferred future locations of the first set of points and actual locations of the second set of points (forward-looking measure) and/or a mismatch between the inferred past locations of the second set of points and actual locations of the first set of points (backward-looking measure). In some implementations, the evaluation measure can be determined in accordance with method 600 described below. In those implementations, where evaluation of the hypothesis includes matching the velocity data to a motion of a rigid body, the evaluation measure can be based, at least in part, on differences between the velocity data of the first set of points and a distribution of velocities of the rigid body. For example, the evaluation measure can be a weighted sum of the squared differences between the velocities of the rigid body and the actual velocities measured by the sensor(s), e.g., the first sensor and, optionally, the second sensor. As another example, the evaluation measure can describe a mismatch (e.g., a sum of weighted squared errors) between the coordinates and/or velocities of the first set of points and the coordinates and/or velocities of the second set of points.

Evaluation of the hypothesis, at block 520, can include determining, in view of the evaluation measure, the values of the fitting parameters. In some implementations, the fitting parameters are determined in view of the velocity data. The velocity data can include radial velocities for at least some of the first set of points, or the second set of points, or both. In some implementations, the velocity data can include radial velocities as detected by multiple sensors, e.g., at least two sensors located differently from each other.

At block 530, the computing device can identify, e.g., based on the evaluation measure meeting a predetermined criterion, that the hypothesized object matches the first set of points (at the time of the first frame) and the second set of points (at the second frame) and that the motion of the hypothesized object is consistent with the velocity data associated with the corresponding points (of the first set or the second set or both). The predetermined criterion can be that the evaluation measure has specific relation (e.g., is above, at, or below) to a threshold value (e.g., a maximum acceptable weighted squared error).

Optionally, the computing device can further identify, based on the evaluated hypothesis, the object of the environment that corresponds to the first set of points and the second set of points as a particular type of object (a car, a truck, a bus, a motorcycle, a pedestrian, etc.).

At block 540, method 500 can continue with the computing device causing a driving path of the AV to be determined in view of the evaluation measure. More specifically, having used the evaluation measure to confirm the hypothesis, the computing device can generate a representation of the identified object. The representation can be a set of geometric descriptors of the identified object, such as a set of coordinates for the object's bounding box or a set of parameters identifying relative orientation of various elements of the object (e.g., ribs and faces) and another set of parameters identifying location and orientation of the object in space (e.g., relative to ground, other objects, or map layout). A person of ordinary skill in the art should recognize that there is an unlimited number of possible representation of various objects. The computing device can provide, to the control system of the AV (e.g., AVCS 140), the representation of the identified object. The control system can subsequently, based on the provided representation, determine the driving path of the AV. Based on the location and motion (translational and rotational) of the identified object, the control system can determine if the AV is to accelerate, brake, turn, change lanes, stop, back up, and like (or perform any combination of such actions). The control system can subsequently output corresponding instructions to powertrain and steering 150, vehicle electronics 160, signaling 170, etc., to ensure that the AV follows the determined driving path.

Figure 6:
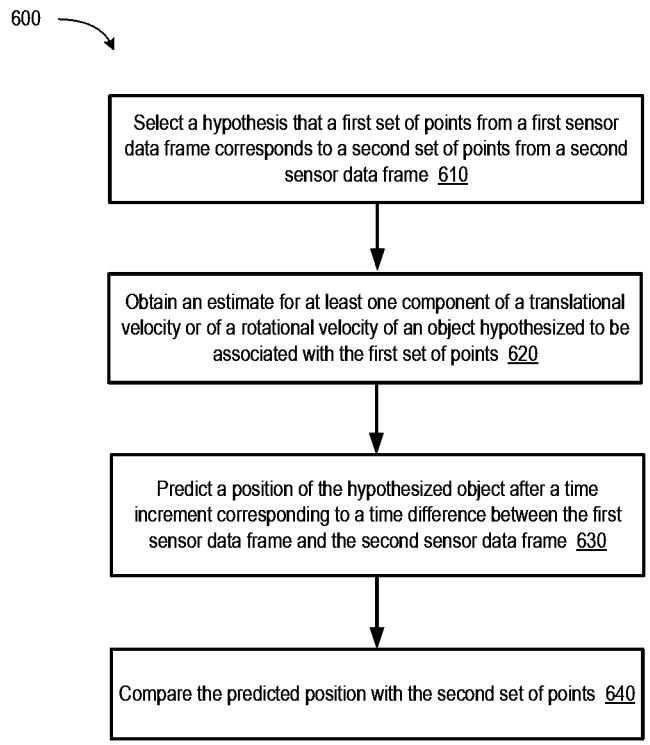
FIG. 6 depicts a flow diagram of an example method of evaluating a hypothesis that a set of point of the first sensing frame corresponds to a set of points of the second sensing frame, in accordance with some implementations of the present disclosure.

FIG. 6 depicts a flow diagram of an example method 600 of evaluating a hypothesis that a set of point of the first sensing frame corresponds to a set of points of the second sensing frame, in accordance with some implementations of the present disclosure. Method 600 can be performed in conjunction with block 520 of method 500 of using Doppler-assisted object identification and point cloud tracking for autonomous driving vehicle applications. At block 610, a computing device performing method 600 (e.g., a device executing software instructions issued by PCM 133 as part of the perception system 132), can select a hypothesis that a first set of points from a first sensing data frame corresponds to a second set of points from a second sensing data frame. At block 620, the method can continue with the computing device obtaining an estimate for the one or more components of a translational velocity or the one or more components of a rotational (angular) velocity of an object hypothesized to be associated with the first set of points. For example, the component(s) of the translational velocity and/or the components) of the rotational velocity can be determined by fitting the velocity data of the first frame (and, optionally, of the second frame) using the rigid body equation.

At block 630, method 600 can continue with the computing device predicting, based on the estimate for the one or more components of the translational velocity or the one or more components the rotational velocity of the hypothesized object, a position of the hypothesized object after a time increment corresponding to a time difference between the first sensing data frame and the second sensing data frame. At block 640, the computing device can compare the predicted position with the coordinates of the second set of points and determine the evaluation measure, e.g., a weighted squared errors in the locations of the points of the second set and the respective locations predicted based on the estimated component(s) of the translational velocity and/or rotational velocity.

Figure 7:
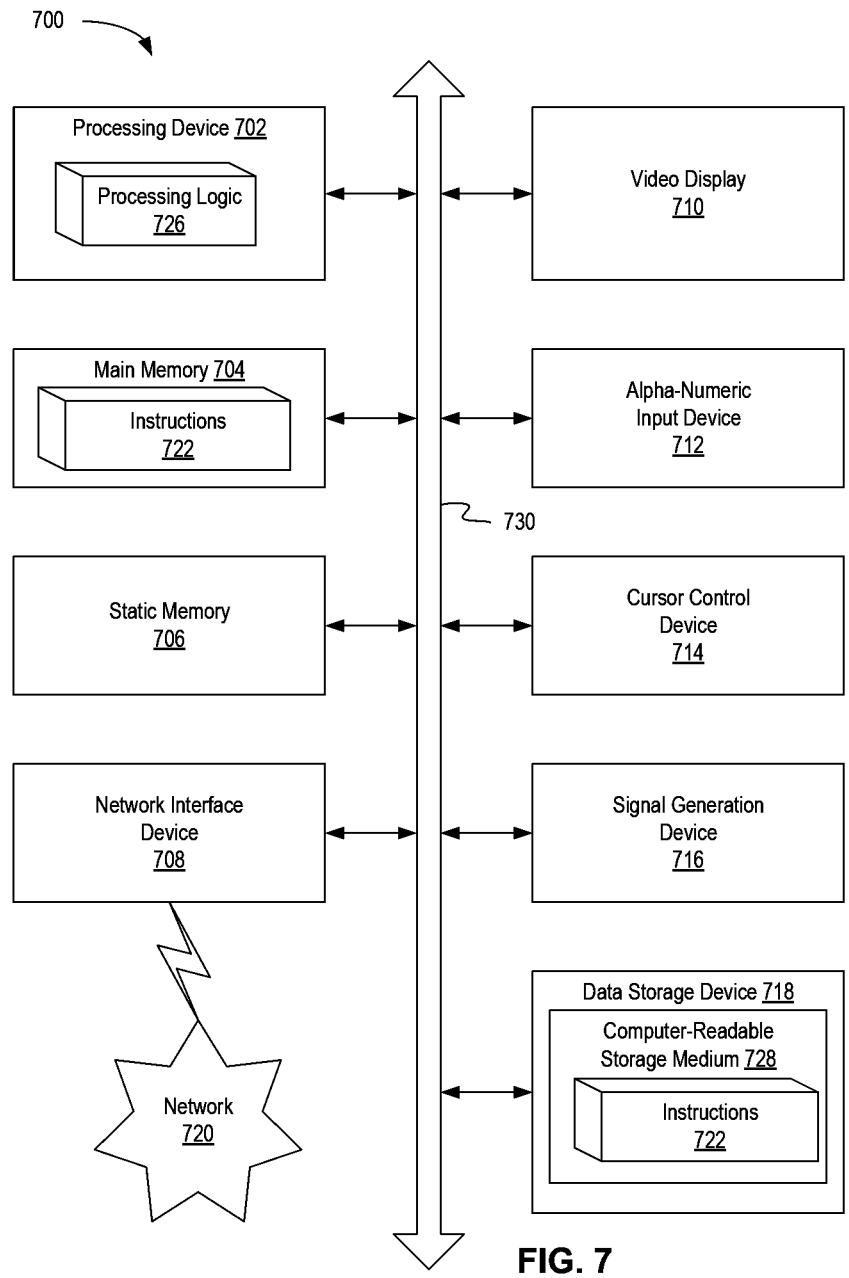
FIG. 7 depicts a block diagram of an example computer device capable of enabling Doppler-assisted object identification and tracking for autonomous driving vehicle application, in accordance with some implementations of the present disclosure.

FIG. 7 depicts a block diagram of an example computer device capable of enabling Doppler-assisted object identification and tracking for autonomous driving vehicle application, in accordance with some implementations of the present disclosure. Example computer device 700 can be connected to other computer devices in a LAN, an intranet, an extranet, and/or the Internet. Computer device 700 can operate in the capacity of a server in a client-server network environment. Computer device 700 can be a personal computer (PC), a set-top box (STB), a server, a network router, switch or bridge, or any device capable of executing a set of instructions (sequential or otherwise) that specify actions to be taken by that device. Further, while only a single example computer device is illustrated, the term "computer" shall also be taken to include any collection of computers that individually or jointly execute a set (or multiple sets) of instructions to perform any one or more of the methods discussed herein.

Example computer device 700 can include a processing device 702 (also referred to as a processor or CPU), a main memory 704 (e.g., read-only memory (ROM), flash memory, dynamic random access memory (DRAM) such as synchronous DRAM (SDRAM), etc.), a static memory 706 (e.g., flash memory, static random access memory (SRAM), etc.), and a secondary memory (e.g., a data storage device 718), which can communicate with each other via a bus 730.

Processing device 702 represents one or more general-purpose processing devices such as a microprocessor, central processing unit, or the like. More particularly, processing device 702 can be a complex instruction set computing (CISC) microprocessor, reduced instruction set computing (RISC) microprocessor, very long instruction word (VLIW) microprocessor, processor implementing other instruction sets, or processors implementing a combination of instruction sets. Processing device 702 can also be one or more special-purpose processing devices such as an application specific integrated circuit (ASIC), a field programmable gate array (FPGA), a digital signal processor (DSP), network processor, or the like. In accordance with one or more aspects of the present disclosure, processing device 702 can be configured to execute instructions performing method 500 of using Doppler-assisted object identification and point cloud tracking and method 600 of evaluating a hypothesis that a set of point of the first sensing frame corresponds to a set of points of the second sensing frame.

Example computer device 700 can further comprise a network interface device 708, which can be communicatively coupled to a network 720. Example computer device 700 can further comprise a video display 710 (e.g., a liquid crystal display (LCD), a touch screen, or a cathode ray tube (CRT)), an alphanumeric input device 712 (e.g., a keyboard), a cursor control device 714 (e.g., a mouse), and an acoustic signal generation device 716 (e.g., a speaker).

Data storage device 718 can include a computer-readable storage medium (or, more specifically, a non-transitory computer-readable storage medium) 728 on which is stored one or more sets of executable instructions 722. In accordance with one or more aspects of the present disclosure, executable instructions 722 can comprise executable instructions performing method 500 of using Doppler-assisted object identification and point cloud tracking and method 600 of evaluating a hypothesis that a set of point of the first sensing frame corresponds to a set of points of the second sensing frame.

Executable instructions 722 can also reside, completely or at least partially, within main memory 704 and/or within processing device 702 during execution thereof by example computer device 700, main memory 704 and processing device 702 also constituting computer-readable storage media. Executable instructions 722 can further be transmitted or received over a network via network interface device 708.

While the computer-readable storage medium 728 is shown in FIG. 7 as a single medium, the term "computer-readable storage medium" should be taken to include a single medium or multiple media (e.g., a centralized or distributed database, and/or associated caches and servers) that store the one or more sets of VM operating instructions. The term "computer-readable storage medium" shall also be taken to include any medium that is capable of storing or encoding a set of instructions for execution by the machine that cause the machine to perform any one or more of the methods described herein. The term "computer-readable storage medium" shall accordingly be taken to include, but not be limited to, solid-state memories, and optical and magnetic media.

Some portions of the detailed descriptions above are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "identifying," "determining," "storing," "adjusting," "causing," "returning," "comparing," "creating," "stopping," "loading," "copying," "throwing," "replacing," "performing," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Examples of the present disclosure also relate to an apparatus for performing the methods described herein. This apparatus can be specially constructed for the required purposes, or it can be a general purpose computer system selectively programmed by a computer program stored in the computer system. Such a computer program can be stored in a computer readable storage medium, such as, but not limited to, any type of disk including optical disks, CD-ROMs, and magnetic-optical disks, read-only memories (ROMs), random access memories (RAMs), EPROMs, EEPROMs, magnetic disk storage media, optical storage media, flash memory devices, other type of machine-accessible storage media, or any type of media suitable for storing electronic instructions, each coupled to a computer system bus.

The methods and displays presented herein are not inherently related to any particular computer or other apparatus. Various general purpose systems can be used with programs in accordance with the teachings herein, or it may prove convenient to construct a more specialized apparatus to perform the required method steps. The required structure for a variety of these systems will appear as set forth in the description below. In addition, the scope of the present disclosure is not limited to any particular programming language. It will be appreciated that a variety of programming languages can be used to implement the teachings of the present disclosure.

It is to be understood that the above description is intended to be illustrative, and not restrictive. Many other implementation examples will be apparent to those of skill in the art upon reading and understanding the above description. Although the present disclosure describes specific examples, it will be recognized that the systems and methods of the present disclosure are not limited to the examples described herein, but can be practiced with modifications within the scope of the appended claims. Accordingly, the specification and drawings are to be regarded in an illustrative sense rather than a restrictive sense. The scope of the present disclosure should, therefore, be determined with reference to the appended claims, along with the full scope of equivalents to which such claims are entitled.

What is claimed is:

1. A method comprising:
   obtaining, by a computing device, a plurality of points imaging an environment around an autonomous vehicle (AV), wherein each of the plurality of points:
     corresponds to a reflection, from a surface of an object of the environment, of a signal emitted by a sensing system of the AV, and
     comprises a location data for a respective reflecting surface, and
   a velocity data for the respective reflecting surface;
   generating a plurality of hypotheses, each of the plurality of hypotheses mapping a first set of points of the plurality of points associated with a first time to a second set of points of the plurality of points associated with a second time;
   for each of the plurality of hypotheses:
     predicting, by the computing device and using the location data and the velocity data, a motion of the first set of points between the first time and the second time;
     obtaining an evaluation measure for the hypothesis using the second set of points and the predicted motion of the first set of points; and
   causing a driving path of the AV to be determined in view of evaluation measures obtained for the plurality of hypotheses.

2. The method of claim 1, wherein causing the driving path of the AV to be determined comprises:
   identifying, based on the evaluation measures obtained for the plurality of hypotheses, the object of the environment that corresponds to the first set of points and the second set of points; and
   providing, to a control system of the AV, a representation of the identified object to determine the driving path of the AV.

3. The method of claim 1, wherein the sensing system of the AV comprises a coherent light detection and ranging device (lidar) and wherein the signal emitted by the sensing system is a phase-modulated or a frequency-modulated electromagnetic wave.

4. The method of claim 3, wherein the coherent lidar is a frequency-modulated continuous-wave lidar.

5. The method of claim 1, wherein the sensing system of the AV comprises a first sensor, and wherein the velocity data for the respective reflecting surface comprises a first component of a velocity of the respective reflecting surface along a first direction from the first sensor to the respective reflecting surface.

6. The method of claim 5, wherein the sensing system of the AV comprises a second sensor located differently from the first sensor, and wherein the velocity data for the respective reflecting surface comprises a second component of the velocity of the respective reflecting surface along a second direction from the second sensor to the respective reflecting surface.

7. The method of claim 6, wherein mapping the first set of points to the second set of points comprises determining, based on the velocity data, a lateral velocity of the respective reflecting surface.

8. The method of claim 1, wherein the motion of the first set of points is subject to a constraint of a rigid body performing a combination of a translational motion and a rotational motion.

9. The method of claim 8, wherein the evaluation measure is based, at least in part, on at least one of:
   a first measure representative of differences between one or more locations associated with the motion of the first set of points and one or more locations associated with the second set of points, or
   a second measure representative of a difference between one or more velocities associated with the motion of the first set of points and one or more velocities associated with the second set of points.

10. The method of claim 1, wherein mapping the first set of points to the second set of points comprises using an iterative closest point algorithm.

11. The method of claim 1, wherein mapping the first set of points to the second set of points comprises:
    associating, with the first set of points, a plurality of fitting parameters, wherein the plurality of fitting parameters characterizes a motion of a rigid body; and
    wherein predicting the motion of the first set of points comprises:
    inferring, based on the plurality of fitting parameters, a change in locations of the first set of points associated with a time difference between the first time and the second time.

12. The method of claim 11, further comprising:
    determining values of the plurality of fitting parameters based at least in part on minimizing a mismatch between the predicted motion of the first set of points and locations of the second set of points.

13. The method of claim 12, wherein at least some of the plurality of fitting parameters are determined in view of the velocity data, wherein the velocity data comprises radial velocities for at least some of the first set of points or the second set of points.

14. The method of claim 11, wherein the second time is earlier than the first time, and wherein the motion of the first set of points is a time-reversed motion.

15. The method of claim 11, wherein the plurality of fitting parameters comprises at least one of a degree of rotation of the rigid body or a degree of translation of the rigid body between the first time and the second time.

16. A system comprising:
    a memory that stores instructions; and
    a computing device to execute the instructions from the memory to:
      obtain a plurality of points imaging an environment around an autonomous vehicle (AV), wherein each of the plurality of points:
        corresponds to a reflection, from a surface of an object of the environment, of a signal emitted by a sensing system of the AV, and
        comprises a location data for a respective reflecting surface, and
      a velocity data for the respective reflecting surface;
      generate a plurality of hypotheses, each of the plurality of hypotheses mapping a first set of points of the plurality of points associated with a first time to a second set of points of the plurality of points associated with a second time;
      for each of the plurality of hypotheses:
      predict, by the computing device and using the location data and the velocity data, a motion of the first set of points between the first time and the second time;

obtain an evaluation measure for the hypothesis using the second set of points and the predicted motion of the first set of points; and cause a driving path of the AV to be determined in view of the evaluation measures obtained for the plurality of hypotheses.

17. The system of claim 16, wherein the sensing system of the AV comprises a coherent light detection and ranging device (lidar) and wherein the signal emitted by the sensing system is a phase-modulated or a frequency-modulated electromagnetic wave.

18. The system of claim 16, wherein the sensing system of the AV comprises a first sensor, and wherein the velocity data for the respective reflecting surface comprises a first component of a velocity of the respective reflecting surface along a first direction from the first sensor to the respective reflecting surface.

19. The system of claim 18, wherein the sensing system of the AV comprises a second sensor, the second sensor located differently from the first sensor, and wherein the velocity data for the respective reflecting surface comprises a second component of the velocity of the respective reflecting surface along a second direction from the second sensor to the respective reflecting surface.

20. A non-transitory computer-readable medium having instructions stored thereon that, when executed by a computing device, cause the computing device to:

obtain a plurality of points imaging an environment around an autonomous vehicle (AV), wherein each of the plurality of points:
corresponds to a reflection, from a surface of an object of the environment, of a signal emitted by a sensing system of the AV, and
comprises a location data for a respective reflecting surface, and
a velocity data for the respective reflecting surface;

generate a plurality of hypotheses, each of the plurality of hypotheses mapping a first set of points of the plurality of points associated with a first time to a second set of points of the plurality of points associated with a second time;

for each of the plurality of hypotheses:
predict, using the location data and the velocity data, a motion of the first set of points between the first time and the second time;
obtain an evaluation measure for the hypothesis using the second set of points and the predicted motion of the first set of points; and
cause a driving path of the AV to be determined in view of the evaluation measures obtained for the plurality of hypotheses.

21. The computer-readable medium of claim 20, wherein the sensing system of the AV comprises a coherent light detection and ranging device (lidar) and wherein the signal emitted by the sensing system is a phase-modulated or a frequency-modulated electromagnetic wave.

22. The computer-readable medium of claim 20, wherein the sensing system of the AV comprises a first sensor, and wherein the velocity data for the respective reflecting surface comprises a first component of a velocity of the respective reflecting surface along a first direction from the first sensor to the respective reflecting surface.

23. The computer-readable medium of claim 22, wherein the sensing system of the AV comprises a second sensor, the second sensor located differently from the first sensor, and wherein the velocity data for the respective reflecting surface comprises a second component of the velocity of the respective reflecting surface along a second direction from the second sensor to the respective reflecting surface.

* * * * *